(12) United States Patent
Hashiba et al.

(10) Patent No.: US 9,703,102 B2
(45) Date of Patent: Jul. 11, 2017

(54) INFORMATION PROCESSING DEVICE INCLUDING HEAD MOUNTED DISPLAY

(71) Applicant: Tomy Company Ltd., Tokyo (JP)

(72) Inventors: Kenta Hashiba, Tokyo (JP); Takanobu Unakami, Tokyo (JP); Kunihiko Kato, Tokyo (JP); Hiromu Ueshima, Kyoto (JP)

(73) Assignee: Tomy Company Ltd., Tokyo (JP)

( * ) Notice: Subject to any disclaimer, the term of this patent is extended or adjusted under 35 U.S.C. 154(b) by 0 days.

(21) Appl. No.: 14/908,470

(22) PCT Filed: Dec. 2, 2015

(86) PCT No.: PCT/JP2015/083910
§ 371 (c)(1),
(2) Date: Jan. 28, 2016

(87) PCT Pub. No.: WO2017/037962
PCT Pub. Date: Mar. 9, 2017

(65) Prior Publication Data
US 2017/0059871 A1 Mar. 2, 2017

(30) Foreign Application Priority Data
Aug. 28, 2015 (JP) ................................ 2015-169855

(51) Int. Cl.
*G09G 5/00* (2006.01)
*G02B 27/01* (2006.01)
(Continued)

(52) U.S. Cl.
CPC .......... *G02B 27/0179* (2013.01); *A63F 13/24* (2014.09); *A63F 13/25* (2014.09);
(Continued)

(58) Field of Classification Search
CPC .............. G02B 27/017; G02B 27/0172; G02B 27/0176; G02B 27/0179; G02B 27/0093;
(Continued)

(56) References Cited

U.S. PATENT DOCUMENTS

2015/0352437 A1* 12/2015 Koseki .................. A63F 13/212
463/31
2016/0282619 A1* 9/2016 Oto ....................... G02B 27/017
2016/0291688 A1* 10/2016 Hirota ....................... G06F 3/14

FOREIGN PATENT DOCUMENTS

JP 2000-105533 A 4/2000
JP 2002-224444 A 8/2002
(Continued)

OTHER PUBLICATIONS

Non-patent cited reference 1 (Explanation about Mario Kart Wii) (Japanese) 6 pages. 2015-558688 Published Jan. 27, 2016 Japan Patent Office. Untranslated.
(Continued)

*Primary Examiner* — Lixi C Simpson
(74) *Attorney, Agent, or Firm* — Rutan & Tucker, LLP

(57) ABSTRACT

[Problem to be Solved]
The present invention has an objective to improve operability in information input in an information processing device that includes a head mounted display to enable head tracking display.
[Solution]
An information processing device includes a hand-held operation unit (10), a head mounted display (20), a first motion sensor (506 to 508) that can detect at least the orientation of the head of the operator, and an information processing unit (30) that executes a head tracking displaying process in which the first motion sensor is used, and a specific process corresponding to an indication of the operator identified by the motion of the operation unit, wherein
(Continued)

(a) INFORMATION PROCESSING UNIT IS INDEPENDENTLY PROVIDED (b) SMARTPHONE BUILT IN HEAD MOUNTED PORTION SERVES BOTH FUNCTIONS OF INFORMATION PROCESSING UNIT AND DISPLAY the motion of the operation unit is detected using a second motion sensor (1603 to 1605) incorporated in the operation unit.

19 Claims, 26 Drawing Sheets

(51) Int. Cl.
  *G02B 27/00* (2006.01)
  *A63F 13/25* (2014.01)
  *A63F 13/24* (2014.01)
  *A63F 13/98* (2014.01)

(52) U.S. Cl.
  CPC .......... *A63F 13/98* (2014.09); *G02B 27/0093* (2013.01); *G02B 27/0172* (2013.01); *G02B 27/0176* (2013.01); *G02B 2027/014* (2013.01); *G02B 2027/0187* (2013.01)

(58) Field of Classification Search
  CPC ...... G02B 2027/014; G02B 2027/0187; A63F 13/24; A63F 13/25; A63F 13/98
  See application file for complete search history.

(56) References Cited

FOREIGN PATENT DOCUMENTS

| | | |
|---|---|---|
| JP | 2007-300974 A | 9/2007 |
| JP | 2007-300980 A | 11/2007 |
| JP | 2008-136694 A | 6/2008 |
| JP | 2012-507068 A | 3/2012 |
| JP | 2013-017737 A | 1/2013 |
| JP | 2013-258614 | 12/2013 |
| JP | 2014-038588 | 2/2014 |
| WO | WO2010/051089 | 5/2010 |
| WO | PCT/JP2015/083910 | 12/2015 |

OTHER PUBLICATIONS

Non-patent cited reference 2 (http://weekly.ascii.jp/elem/000/000/323/323901)(Japanese) 10 pages. Product Description of Gear VR. 2015-558688 Published Jan. 27, 2016 Japan Patent Office. Untranslated.

Tatsuki, Hayashi Yu, "Head Diopter Correction is also a Safe Good Glasses People Mount Display 'Gear VR' Report", Aug. 4, 2015, English translation of the non-patent cited reference 2, 6 pages.

Notice of reasons for refusal dated Jan. 27, 2016 (First office action) 2015-558688 7 pages. Untranslated.

First office action mailed Jan. 19, 2016 for Japanese Patent Application 2015-558688, 8 pages. Japan Patent Office. English translation.

Second office action ("Notice of reasons for refusal") for Japanese Patent Application 2015-558688 dated Mar. 23, 2016, 2 pages. Japan Patent Office. Untranslated.

Second office action mailed Mar. 17, 2016, 2 pages, for Japanese Patent Application 2015-558688, Japan Patent Office, English translation.

Mario Kart Wii Product Description, Nintendo, Non-patent cited reference 3 (Explanation about Mario Kart Wii) Apr. 30, 2008. (Japanese) 9 pages.

Mario Kart Wii Product Description, Nintendo, Clean copy of Non-patent cited reference 3 (Japanese) 8 pages. Untranslated. Apr. 30, 2008. downloaded from https://www.1101.com/nintendo/mariokart_wii/2008-04-30.html on Jul. 22, 2016.

Mario Kart Wii Product Description, Nintendo, English translation of non-patent cited reference 3, 7 pages. Apr. 30, 2008.

International Search Report(ISA) (Japanese) for International Patent Application PCT/JP2015/083910 mailed Aug. 28, 2015. Japan Patent Office. 3 pages. Untranslated.

Opinion regarding the ISA (Japanese) for International Patent Application No. PCT/JP2015/083910 mailed Feb. 23, 2016, Japan Patent Office, 8 pages. Untranslated.

Partial translation of the opinion regarding the ISA for International Patent Application No. PCT/JP2015/083910, 1 page. English translation.

Notice of Allowance ("Decision to Grant a Patent") mailed May 20, 2016 for Japanese Patent Application 2015-558688, Japan Patent Office, 3 pages. English translation.

Notice of Allowance ("Decision to Grant a Patent") mailed May 20, 2016 for Japanese Patent Application 2015-558688, Japan Patent Office, 3 pages. Untranslated.

\* cited by examiner

FIG.1
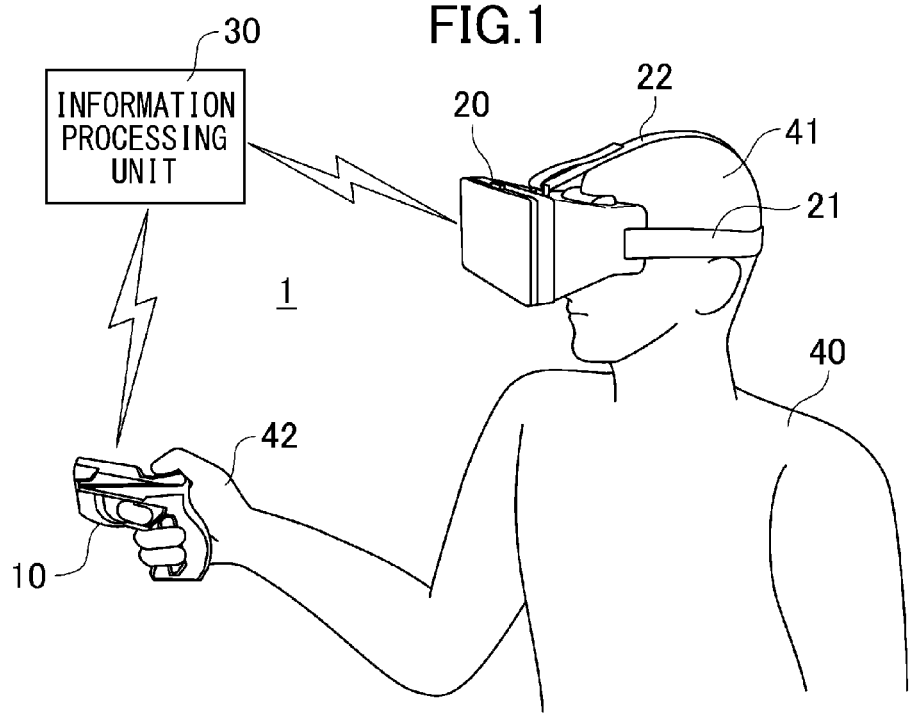
(a) INFORMATION PROCESSING UNIT IS INDEPENDENTLY PROVIDED
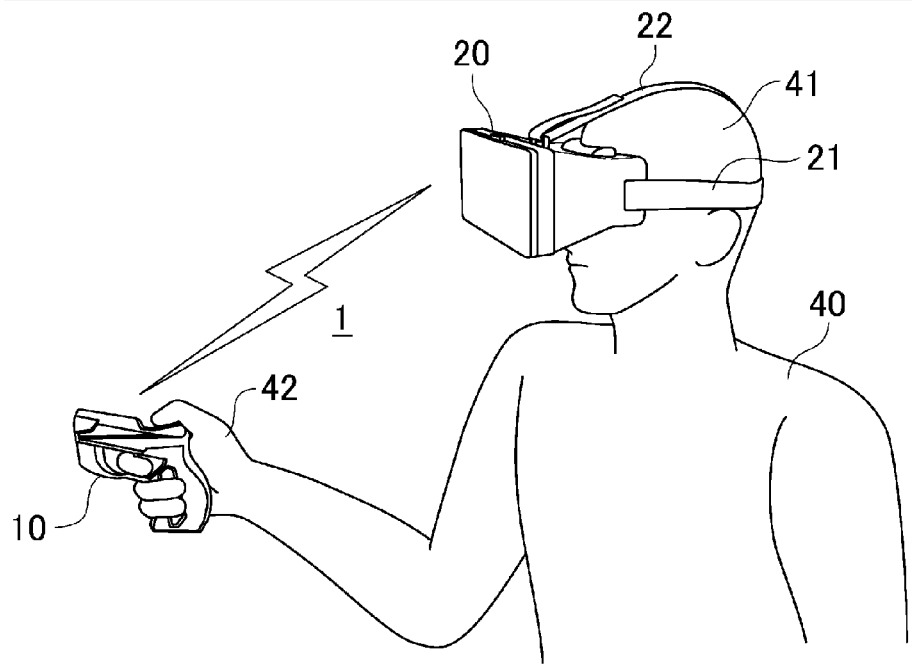
(b) SMARTPHONE BUILT IN HEAD MOUNTED PORTION SERVES BOTH FUNCTIONS OF INFORMATION PROCESSING UNIT AND DISPLAY

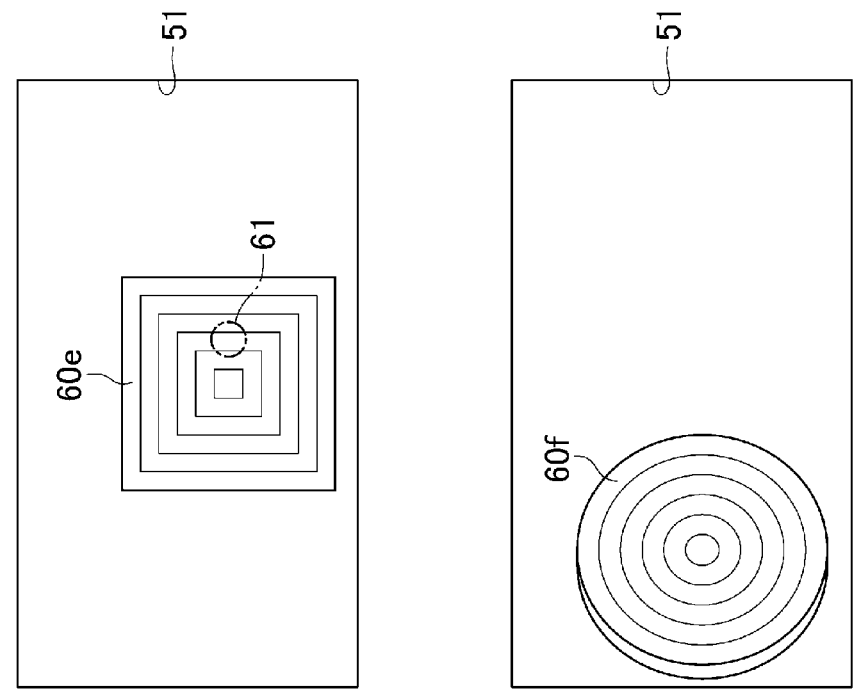
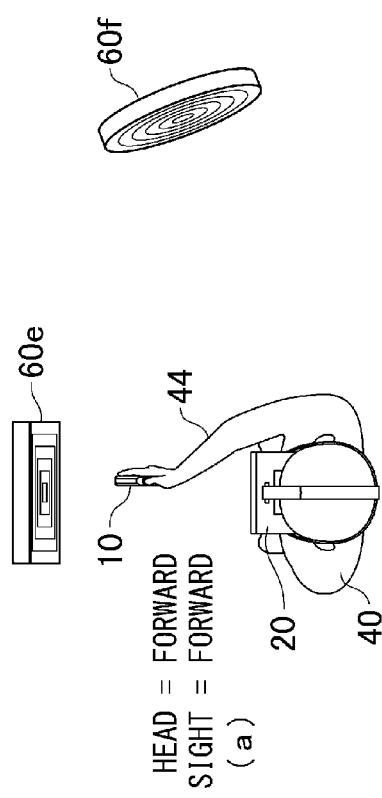
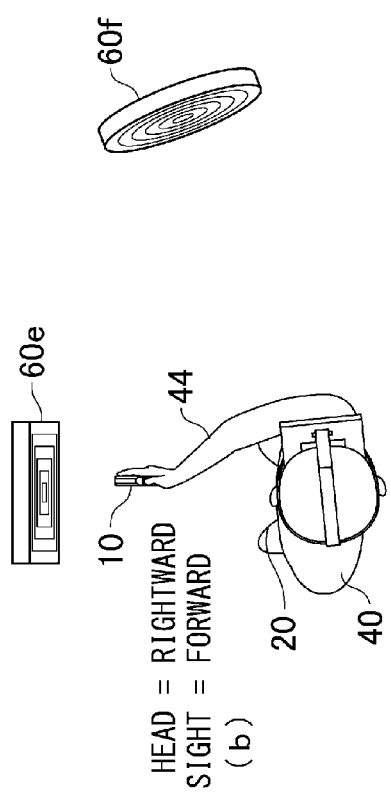
FIG.18

FIG.22
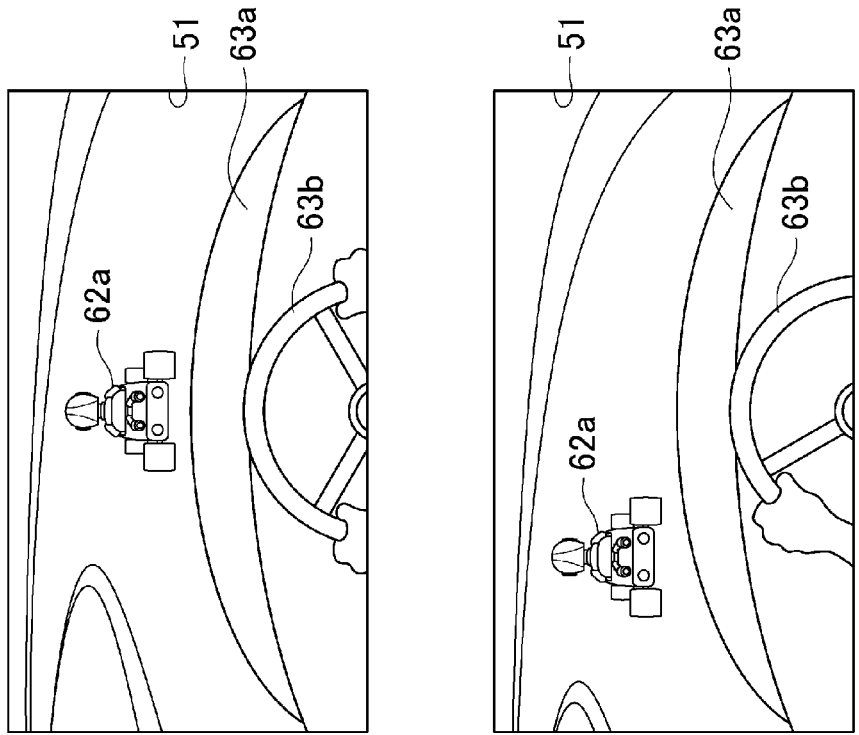
PICTURE ON DISPLAY SCREEN
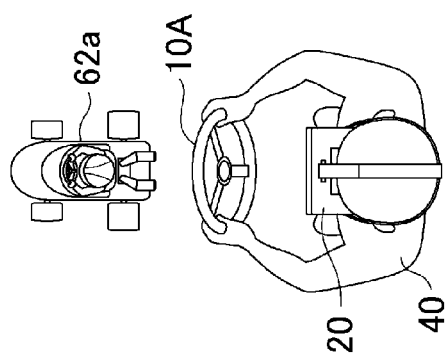
(a)
HEAD = FORWARD
OPERATING WHEEL = NEUTRAL
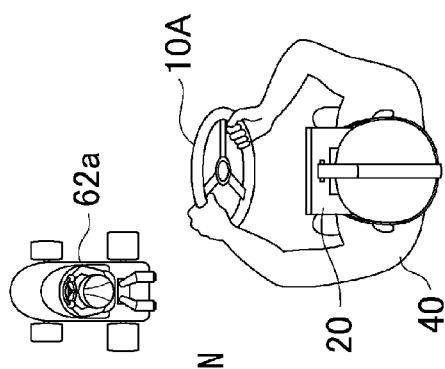
(b)
HEAD = FORWARD
OPERATING WHEEL = RIGHT TURN
OPERATOR'S ACTION

INFORMATION PROCESSING DEVICE INCLUDING HEAD MOUNTED DISPLAY

This patent application is a 35 U.S.C. §371 Application of International Patent Application Number PCT/JP2015/083910, titled "INFORMATION PROCESSING DEVICE INCLUDING HEAD MOUNTED DISPLAY" having an International Filing Date of Dec. 2, 2015, and also claims priority under 35 USC 119 to Japanese Patent Application No. 2015-169855 (filed Aug. 28, 2015), both of which are incorporated herein by reference in their entirety.

TECHNICAL FIELD

The present invention relates to an information processing device that includes a head mounted display to enable head tracking display.

BACKGROUND TECHNOLOGY

An information processing device (e.g., a video game device) has been known that enables, by using a head mounted display (HMD) incorporating a motion sensor, head tracking display (a function of following the orientation of the head of an operator and displaying a facing image on the head mounted display) of a global image (e.g., 360-degree panoramic image) (e.g., see Patent Document 1).

According to such an information processing device, an operator can enjoy various types of games (e.g., shooter games, racing games, sports games, and the like) while changing a visual field in any direction in a virtual space that is constituted by a global image (e.g., a full spherical panoramic image, a hemispherical panoramic image, a 360-degree horizontal panoramic image, a panoramic image in a given area thereof, or the like) that is prepared in advance in accordance with the game type.

RELATED TECHNICAL DOCUMENT

Patent Document

Patent Document 1: Japanese Patent Laid-Open No. 2013-258614

SUMMARY OF INVENTION

Problems to be Solved

In the information processing device of this kind, in order to enjoy play with more pleasure, an operation unit having a good operability (e.g., a hand-held remote controller) is required. This is because, although an operator wearing a head mounted display can be absorbed in a virtual space, the operator is completely isolated from a real space, which makes the operator unable to see his or her own hands manipulating the operation unit.

Moreover, in the information processing device of this kind, the operator can freely change a visual field by turning in any direction (longitudinal and lateral directions and further a vertical direction) and taking any inclined posture, and thus the operation unit has a demand for a more reliable operability in order to accurately indicate any direction and accurately indicate any motion, even in the visual field or the virtual space provided in such a manner.

In this regard, in the device described in Patent Document 1, a technique is employed in which a marker attached to a hand-held stick-shaped operation unit is captured by a camera, and a motion of the operation unit is recognized using an image acquired by the camera, but with such a technique, when the operator turns his or her back on the camera, and the marker disappears in the visual field of the camera, it is evident that the motion of the operation unit is no longer recognizable.

In addition, in the information processing device of this kind, it is possible in principle to progress a game using the whole area of a virtual space constituted by a global image, but what an operator can see is limited to an image (a space) in a given angle-of-view frame in the virtual space, the given angle-of-view frame being specified by the orientation of the head, and thus in order to indicate a direction or a movement using the stick-shaped operation unit, a special consideration of the mutual relation between both the spaces is requested.

The inventor obtained a finding that, at this point, it is possible to enjoy play with more pleasure by enabling the simultaneous display or alternatively switching display of an image in a given angle-of-view frame facing the orientation of the head of the operator, and an image in a given angle-of-view frame facing fixed direction such as a forward, rearward, rightward, and leftward direction or an image in a given angle-of-view frame facing a direction indicated by the stick-shaped operation unit.

The present invention is made in view of the above-mentioned technical background and has an objective to improve operability in information input in an information processing device that includes the head mounted display of this kind to enable head tracking display.

The other objectives, operations, and advantages of the present invention will become readily apparent to those skilled in the art upon referencing to the following description herein.

Measures to Solve Problems

The above-mentioned technique problems can be solved by an information processing device that includes a head mounted display with the following configuration.

That is, the information processing device includes: an operation unit that is hand-held or wearable; a head mounted display that is mounted to the head of an operator in such a manner as to be disposed in front of the eyes of the operator; a first motion sensor that can detect a motion of the head of the operator; and an information processing unit that displays, on the display, an image in a predetermined angle-of-view frame in a preset global image, the predetermined angle-of-view frame corresponding to the orientation of the head of the operator identified using the first motion sensor, and executes a specific process corresponding to an indication of the operator identified by a motion of the operation unit, wherein the motion of the operation unit is detected using a second motion sensor incorporated in the operation unit.

With such a configuration, the information processing unit is a unit that executes a specific process of fulfilling a head tracking displaying function for a global image using a detection output from a first motion sensor (e.g., incorporated in a head mounted tool) simultaneously with recognizing and dealing with an indication of the operator using a detection output from a second motion sensor (incorporated in an operation unit), and thus the indication of the operator is not missed or misidentified depending on the orientation of the operator like a conventional device that recognizes the indication of the operator using a marker and a camera. Therefore, the operator can give an appropriate indication to the information processing unit using a motion of the operation unit (e.g., position, posture, and/or changes therein) from any posture or rotation angle, while freely looking around in the global image, and thus it is possible to significantly improve the operability of the information processing device of this kind.

Note that the "head mounted display" here is not limited to a display incorporated in a head mounted tool to be described later (including the display of a smartphone) and broadly means a display retained in front of the eyes of an operator without being supported by a hand, such as a display to be put on ears (e.g., a spectacles-type display), a display supported by a head band, and a display supported by a headgear.

According to a preferred embodiment of the present invention, when the indication of the operator indicates a certain direction by the motion of the operation unit (e.g., position, posture, and/or changes therein), the specific process may be a process of drawing a predetermined cursor on the global image in the indicated direction, or a process of comparing an indicated position on the global image in the indicated direction with a target position disposed in advance on the global image and determining that a predetermined event has occurred at least on condition that the indicated position coincides with the target position within a predetermined allowable range.

With such a configuration, by indicating a certain direction in a real space using the motion of the operation unit, it is possible to draw a predetermined cursor on the global image in the indicated direction in a virtual space regardless of whether or not any area in the global image is displayed on the display, or to compare an indicated position on the global image in the indicated direction with a target position disposed in advance on the global image and determine that a predetermined event has occurred at least on condition that the indicated position coincides with target position within a predetermined allowable range.

According to a preferred embodiment of the present invention, when the operator indicates a movement of a certain object by the motion of the operation unit, the specific process may be a process of drawing a figure corresponding to a path of the movement of the object at a corresponding position on the global image, or a process of comparing the path of the movement of the object with a target path disposed in advance on the global image and determining that a predetermined event has occurred at least on condition that the path of the movement of the object coincides with a target path within a predetermined allowable range.

With such a configuration, by indicating a movement of a certain object in the real space using the motion of the operation unit, it is possible to draw a figure corresponding to the path of the movement of the object at a corresponding position on the global image in the virtual space, or to compare the path of the movement of the object with a target path disposed in advance on the global image and determine that predetermined event has occurred at least on condition that the path of the movement of the object coincides with a target path in a predetermined allowable range.

According to a preferred embodiment of the present invention, the information processing unit is a unit that executes a computer program for implementing a shooter game, where the operation unit has an exterior shape in the form of a predetermined shooting weapon, and when the indication of the operator indicates a direction of a sight by the motion of the operation unit by the operator, the specific process may be a process of drawing a predetermined sight mark on the global image in the indicated direction, or a process of comparing a sight position on the global image in the indicated direction with a predetermined target position disposed in advance on the global image and determining that a hitting event has occurred at least on condition that the sight position coincides with the predetermined target position within a predetermined allowable range.

With such a configuration, by indicating a direction of the sight using a motion of the shooting weapon constituting the operation unit in the real space, it is possible to draw a predetermined sight mark on the global image in the indicated direction in the virtual space, or to compare a sight position on the global image in the indicated direction with a predetermined target position disposed in advance on the global image and determine that a hitting event has occurred at least on condition that the sight position coincides with the target position within a predetermined allowable range.

According to a preferred embodiment of the present invention, the information processing unit is a unit that executes a computer program for implementing a racing game, where the operation unit has an exterior shape in the form of a steering tool of a movable body, (e.g., a racing car, a motorcycle, a motorboat, a bicycle, or the like) and when the indication of the operator indicates a direction in which the movable body is to travel, by the motion of the operation unit, the specific process may be a process of drawing a figure corresponding to the movable body on the global image in such a manner that the figure travels in the indicated direction.

With such a configuration, by an operator indicating a direction in which the movable body is to travel, using a motion of the steering tool constituting the operation unit in the real space, it is possible to draw a figure corresponding to the movable body on the global image such that the movable body travels in the indicated direction in the virtual space.

According to a preferred embodiment of the present invention, the racing game is a car racing game, where the steering tool has an exterior shape in the form of a steering wheel of a racing car, and when the indication of the operator indicates a direction in which the racing car is to travel, by the motion of the operation unit, the specific process may be a process of drawing a figure corresponding to the racing car on the global image in such a manner that the figure travels in the indicated direction.

With such a configuration, by an operator indicating a direction in which the racing car is to travel, using a motion of a steering wheel constituting the operation unit in the real space, it is possible to draw a figure corresponding to the racing car on the global image such that the racing car travels in the indicated direction in the virtual space.

According to a preferred embodiment of the present invention, the information processing unit is a unit that executes a computer program for implementing a sports game involving an action of hitting or returning a ball with a ball-hitting tool such as a bat and a paddle, and when the indication of the operator indicates a swing movement of the ball-hitting tool by the motion of the operation unit by the operator, the specific process may be a process of drawing a figure corresponding to a path of the movement of the ball-hitting tool on the global image at a corresponding position, or a process of comparing the path of the movement of the ball-hitting tool with a target path disposed in advance on the global image and determining that a ball-hitting event has occurred at least on condition that the path of the movement of the ball-hitting tool coincides with the target path within a predetermined allowable range.

With such a configuration, by indicating a swing movement of the ball-hitting tool, using a motion of the ball-hitting tool constituting the operation unit in the real space, it is possible to draw a figure corresponding to the path of the movement of the ball-hitting tool, in the virtual space at the corresponding position on the global image, or by indicating a target path disposed on the panoramic image, using a motion of the ball-hitting tool constituting the operation unit in the real space, it is possible to cause a ball-hitting event to occur, the ball-hitting event being to be a condition for progressing the game.

According to a preferred embodiment of the present invention, the information processing unit may further include a function of displaying, on the display, an image in a predetermined angle-of-view frame in the global image, the predetermined angle-of-view frame corresponding to a direction indicated by the operation unit that is identified using the second motion sensor, instead of an image corresponding to the orientation of the head of the operator or together with an image facing the orientation of the head of the operator.

With such a configuration, by an operator indicating any direction with the operation unit using the second motion sensor, it is possible to freely make a search in any direction on the global image as if to light the direction by a searchlight.

According to a preferred embodiment of the present invention, the information processing unit may further include a function of displaying images in one or more predetermined angle-of-view frames in the global image, the one or more predetermined angle-of-view frames corresponding to one or more of directions such as a rightward, leftward, rearward, upward, and downward direction with respect to the orientation of the head of the operator identified using the first motion sensor, in one or more predetermined windows on the display together with an image corresponding to the orientation of the head of the operator.

With such a configuration, an operator can simultaneously observe images in one or more predetermined angle-of-view frames facing one or more directions such as rightward, leftward, rearward, upward, and downward direction with respect to the orientation of the head of the operator identified using the first motion sensor, in an image corresponding to the global image, and it is thus possible to perform the head tracking display while observing not only the front of the operator but also the situation in the other directions that are predetermined.

According to the present invention and a preferred embodiment thereof, the second motion sensor may include one or more of a triaxial acceleration sensor, a triaxial angular velocity sensor, and a triaxial geomagnetic sensor.

With such a configuration, for example, with the combination of the triaxial acceleration sensor and the triaxial geomagnetic sensor, the combination further including the triaxial angular velocity sensor, or the like, it is possible to detect the motion of the operation unit (e.g., position, orientation, and/or changes therein) with high accuracy as needed using the second motion sensor.

According to the present invention and a preferred embodiment thereof, the display retained on the head mounted tool, the first motion sensor, and the information processing unit are substituted with corresponding functions of a commercial smartphone.

With such a configuration, it is possible to implement the information processing device that includes the head mounted display according to the present invention at low cost only with the operation unit, the head mounted tool, and the smartphone, without separately including a personal computer or a dedicated game information processing device.

According to the present invention and a preferred embodiment thereof, the head mounted tool may include: a main body with a window opening that opens in front of eyes of one the wearer; a window plate that is hinged in such a manner as to open and close the window opening of the main body and open outward; a retainer that makes a smartphone retained on an inner side of the window plate with the screen of the smartphone turned inward; and an optical system that is interposed between the eyes of the wearer and the smartphone in a state where the window plate is closed.

With such a configuration, it is possible to configure the video game device according to the present invention at low cost only with the operation unit, the head mounted tool, and the smartphone, and moreover to make it easy to attach/detach the smartphone to/from the head mounted tool.

According to the present invention and a preferred embodiment thereof, the global image includes a full spherical panoramic image, a hemispherical panoramic image, a 360-degree panoramic image, or a panoramic image of a given area thereof.

With such a configuration, it is possible to make an optimal design in accordance with the dimensions of the virtual space requested to the game, the grade of a product, or the like.

The present invention seen from another aspect is a computer program causing a computer to function as an information processing unit in an information processing device, the information processing device comprising: a head mounted display that is mounted to a head of an operator in such a manner as to be disposed in front of eyes of the operator; a first motion sensor that can detect at least an orientation of the head of the operator; an operation unit in which a second motion sensor is incorporated, the operation unit being hand-held or wearable; and an information processing unit, wherein the information processing unit includes: a unit for displaying, on the display, an image in a predetermined angle-of-view frame in a preset global image, the predetermined angle-of-view frame corresponding to the orientation of the head of the operator identified using the first motion sensor; and a unit for executing a specific process corresponding to an indication of the operator identified by the motion of the operation unit that is detected using the second motion sensor.

According to a computer program having such a configuration, it is possible to cause the computer to function as an information processing device that constitutes the device according to the present invention.

An information processing device according to a more specific embodiment of the present invention may include: a head mounted tool; a smartphone that is in the head mounted tool and is disposed such that a display screen of the smartphone faces a front of eyes of a wearer through a predetermined optical system, the smartphone including a first motion sensor incorporated therein; and an operation unit that includes a second motion sensor incorporated therein, is hand-held or wearable, and further is to be in a wireless or wired connection with the smartphone, wherein the smartphone may include: a unit for displaying, on the display, an image in a predetermined angle-of-view frame in a preset global image, predetermined angle-of-view frame corresponding to the orientation of the head of the operator identified using the first motion sensor; and a unit for executing a specific process corresponding to an indication of the operator identified by the motion of the operation unit that is detected using the second motion sensor.

With such a configuration, it is possible to implement an inexpensive device constituted by the operation unit, the head mounted tool, and the smartphone only by installing a predetermined application program to the smartphone, without separately including a personal computer or a dedicated game information processing device.

At this point, the operation unit may be a unit having an exterior shape in a form of a tool that is used in a virtual space perceived through the display.

With such a configuration, an operator can indicate any direction or movement in the virtual space without incongruity while being absorbed in a virtual space through a picture on the display screen, by actually touching in the real space with skin the operation unit having an exterior shape that matches the virtual space.

At this point, the operation unit may have an exterior shape in a form of a gun and include: an operating element that is positioned in a trigger portion; an operation information generation unit that generates operation information corresponding to an operation of the operating element in response to the operation of the operating element; and a communication unit that transmits the operation information to the smartphone in a wired or wireless manner.

With such a configuration, it is possible to easily perform an action such as aiming a sight to any target and shooting the target in the virtual space through a natural action of taking aim with a gun, while being absorbed in the virtual space through a picture on the display screen, by actually touching in the real space with skin a gun-shaped operating element having an exterior shape that matches the game.

At this point, the second motion sensor may include one or more of a triaxial acceleration sensor, a triaxial angular velocity sensor, and a triaxial geomagnetic sensor.

With such a configuration, for example, with the combination of the triaxial acceleration sensor and the triaxial geomagnetic sensor, the combination further including the triaxial angular velocity sensor, or the like, it is possible to detect the position, orientation, and/or changes therein of the operation unit with high accuracy as needed using the second motion sensor.

At this point, the head mounted tool may include: a main body with a window opening that opens in front of eyes of one the wearer; a window plate that is hinged in such a manner as to open and close the window opening of the main body and open outward; a retainer that retains a smartphone on an inner side of the window plate with the screen of the smartphone facing inward; and an optical system that is interposed between the eyes of the wearer and the smartphone in a state where the window plate is closed.

With such a configuration, it is possible to implement the head mounted tool that makes it easy to attach or detach the smartphone and can cause the display screen of the smartphone to function as the display unit of the head mounted display.

The present invention seen from another aspect can be understood as an operation unit generally applicable to the information processing device of this kind. That is, the operation unit includes a main body that has an exterior shape in a form of a gun, wherein the main body includes: an operating element that is positioned in a trigger portion; an operation information generation unit that generates corresponding operation information in response to the operation of the operating element; motion sensor that includes one or more of a triaxial acceleration sensor, a triaxial angular velocity sensor, and a triaxial geomagnetic sensor; a motion information generation unit that generates motion information based on an output from the motion sensor; and a communication unit that sends out the operation information generated by the operation information generation unit and the motion information generated by the motion information generation unit to the outside in a wired or a wireless manner.

With such configurations, it is possible to provide an operating element that has a good operability and is suitable to the information processing device of this kind that enables head tracking display in a virtual space.

Advantageous Effect of Invention

According to the present invention, it is possible to improve operability in information input in an information processing device that includes the head mounted display of this kind to enable head tracking display.

BRIEF DESCRIPTION OF DRAWINGS

FIG. 1 is an external view illustrating an example of a device according to the present invention in a use state.

FIG. 18 is a (second) explanatory diagram illustrating the relation between an action by an operator and a picture on a display screen.

FIG. 22 is a (sixth) explanatory diagram illustrating the relation between an action by an operator and a picture on a display screen.

DESCRIPTION OF EMBODIMENT

Figure 2:
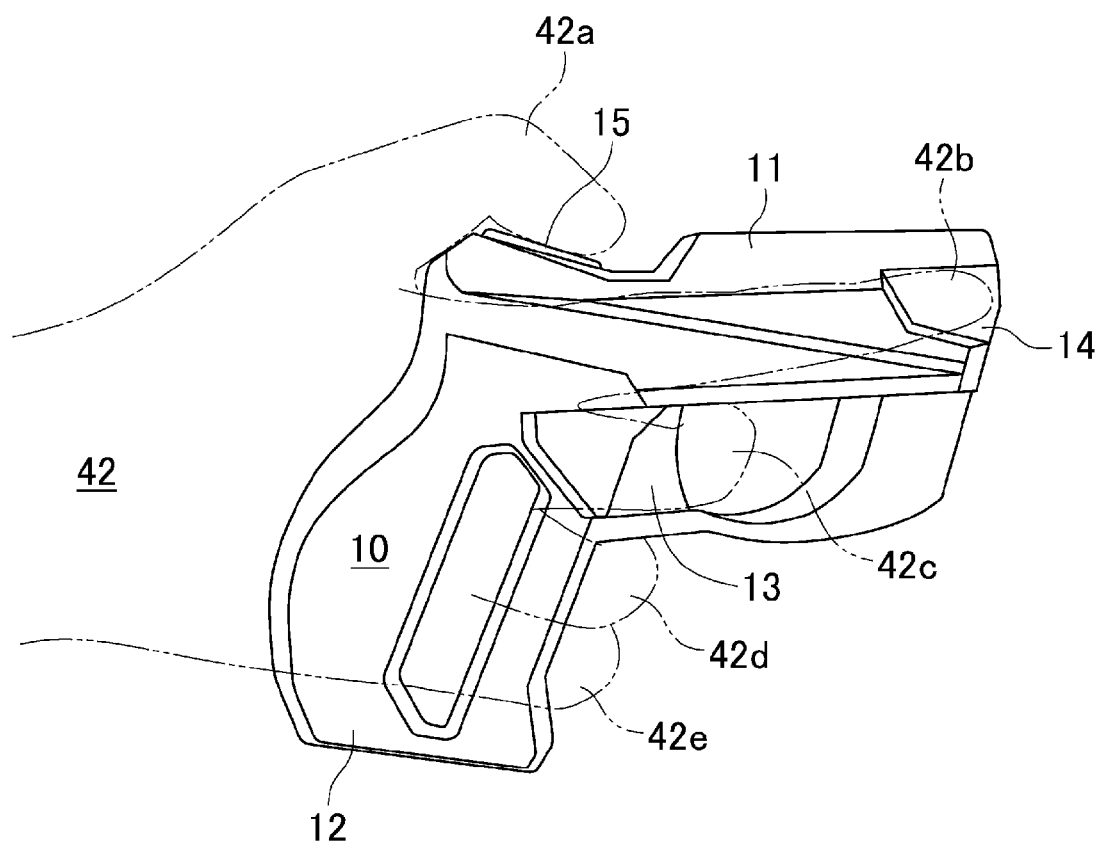
FIG. 2 is an enlarged external view illustrating an operation element in the form of a gun.

Hereinafter, there will be described in detail, with reference to the accompanying drawings, a preferable embodiment of an information processing device that includes a head mounted display according to the present invention, enabling head tracking display.

[General Configuration of Device]

FIG. 1 is an external view illustrating an example of a device according to the present invention in a use state. As illustrated in FIG. 1(a), an information processing device 1 is implemented in the example as a video game device, and is formed mainly by an operation unit 10, a head mounted tool 20, and an information processing unit 30.

The operation unit 10 includes one or more operating elements (to be described later in detail with reference to FIG. 2), is configured to be hand-held (e.g., grasped by a palm or pinched with fingers) or wearable (e.g., mounted on a finger or a wrist, or integrated into a globe), and is formed in the form of a tool to be used by an operator 40 in a virtual space that constitutes a target video game (e.g., in a shooter game, a shooting weapon such as a gun, in a racing game, a steering tool such as a steering wheel, and in a ball sports game, a ball-hitting tool such as a bat, racket, golf club). In the example illustrated in FIG. 1, the operation unit 10 is formed in the shape of a gun. Some examples of a specific structure of the operation unit 10 will be described later in detail with reference to FIG. 2 to FIG. 5.

The head mounted tool 20 is mounted on a head 41 of the operator 40 such that a predetermined display device (not illustrated) is disposed in front of the operator 40's eyes, and incorporates a first motion sensor (to be described later in detail with reference to FIG. 9). A specific configuration of the head mounted tool 20 will be described later in detail with reference to FIG. 7 and FIG. 8.

The information processing unit 30 extracts image information corresponding to an image in a predetermined angle-of-view frame G (to be described later in detail with reference to FIG. 14) facing in the orientation of the head 41 (the orientation of a face) of the operator 40 that is identified using the first motion sensor, from image information corresponding to a global image constituting the video game (e.g., a full spherical panoramic image, a hemispherical panoramic image, a 360-degree panoramic image, or a panoramic image of a given area thereof), and supplies the extracted image information to a display device of the head mounted tool 20, so as to achieve head tracking display of the global image on a screen of the display device (a function of following the orientation of the head 41 of the operator 40 and causing the head mounted display to display an image facing the orientation). In addition, information processing unit 30 has a function of executing a predetermined game progress process in accordance with the motion of the operation unit 10 (e.g., position, posture, and/or changes therein) and the operation of an operating element. The details of the functions of the information processing unit 30 will be described later in detail with reference to flow charts illustrated in FIG. 10 to FIG. 13.

Figure 14:
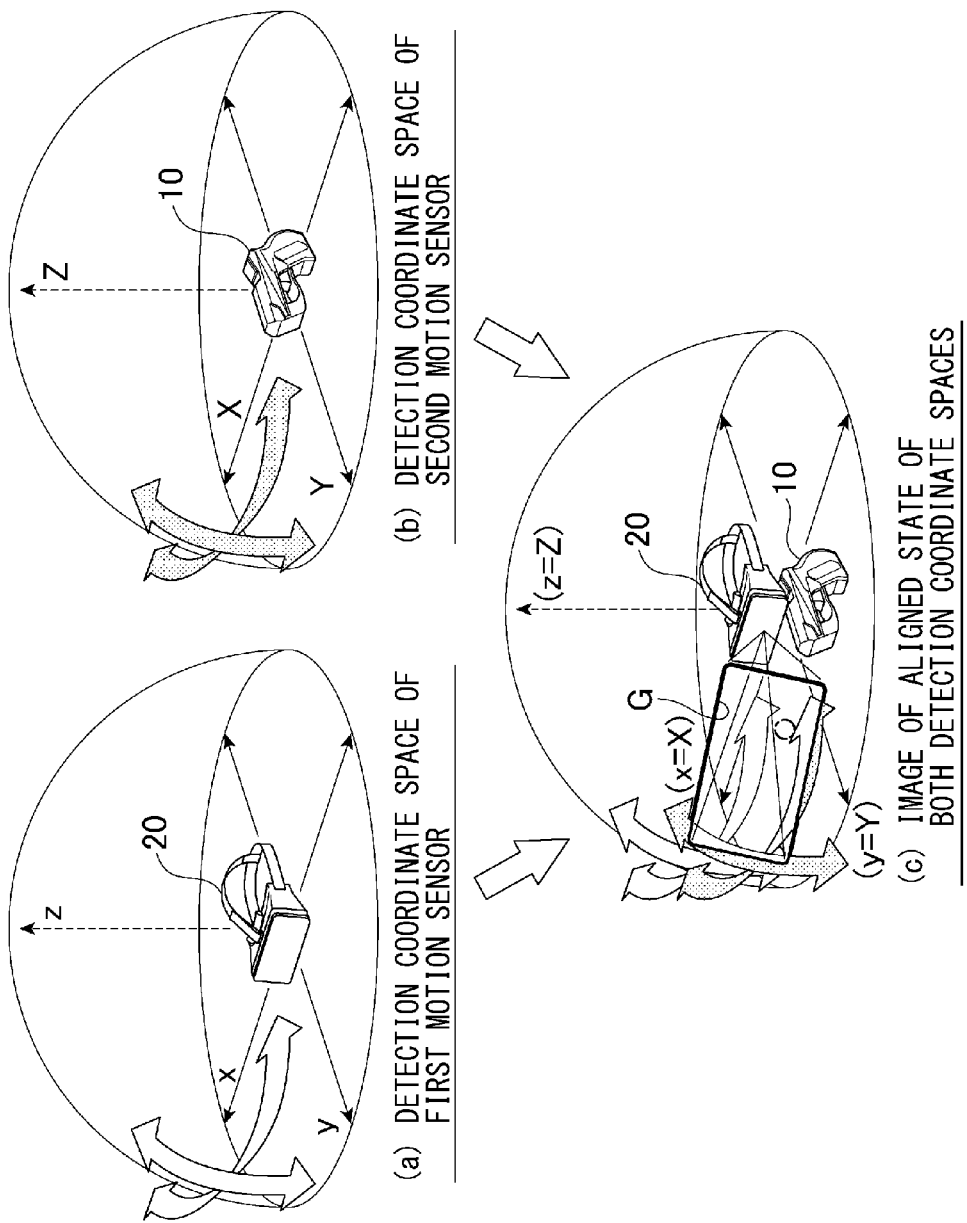
FIG. 14 is an explanatory diagram illustrating the relation between the detection coordinate space of a first motion sensor and the detection coordinate space of a second motion sensor.

Additionally, the operation unit 10 newly includes a second motion sensor built therein (to be described later with reference to FIG. 3). With reference to FIG. 14, there will be described later in detail the mutual relationship among a local coordinate system (x,y,z), a local coordinate system (X,Y,Z), and a world coordinate system (not illustrated), the local coordinate system (x,y,z) defining the hemispherical detection coordinate space of the first motion sensor, the local coordinate system (X,Y,Z) defining the hemispherical detection coordinate space of the second motion sensor, the world coordinate system defining a hemispherical coordinate space where a hemispherical panoramic image is disposed.

Furthermore, the information processing unit 30 is arranged to have a function of reflecting an indicating motion of the operator, which is identified using the second motion sensor, on panoramic image in a predetermined mode, as will be described later with reference to the flow charts illustrated in FIG. 10 to FIG. 13 and explanatory diagrams illustrated in FIG. 15 to FIG. 23.

Here, the communication between the operation unit 10, the head mounted tool 20, and the information processing unit 30 may be wired communication using an electric cord or an optical fiber, or wireless communication such as Bluetooth and infrared communication.

It is obvious that the functions of the information processing unit 30 can be implemented by a personal computer (hereafter, abbreviated as a "PC"), an information processing device dedicated to game, or the like, and additionally by a portable intelligent information terminal (hereafter, referred to as a "smartphone"). At this point, by incorporating the smartphone itself into the head mounted tool 20 to make the display screen of the smartphone to function as a display device, it is possible to implement a video game device according to the present invention with a very simple configuration at low cost by connecting the operation unit 10 and the head mounted tool 20 with the smartphone incorporated therein through wired communication or wireless communication, as illustrated in FIG. 1(b) (see FIG. 7 to FIG. 9).

[Operation Unit]

Next, some specific examples of the operation unit will be described. FIG. 2 is an enlarged external view illustrating the operation unit in the form of a gun. As illustrated in FIG. 2, the operation unit 10 is formed into a gun shape with a barrel 11 and a grip portion 12, including a first operating element 13 that is configured as a trigger portion, a second operating element 14 that is positioned on a right side face at a front-end portion of the barrel, and a third operating element 15 that is positioned on an upper face at a rear-end portion of the barrel. The operating elements 13, 14, and 15 are each configured as a momentary-type push button. Such a gun-shaped operation unit is configured such that the first operating element 13 can be operated by a second finger 42c, the second operating element 14 can be operated by a first finger 42b, and further the third operating element 15 can be operated by a thumb 42a, with the grip portion 12 gripped by a third finger 42d and a fourth finger 42e. As will be described later with reference to FIG. 3, the operation unit 10 includes a triaxial acceleration sensor 1603, a triaxial angular velocity sensor 1604, and a triaxial geomagnetic sensor 1605, which are incorporated therein, constituting the second motion sensor. Thus, the sensors enable unrestrictedly sensing the motion of the gun-shaped operation unit 10 (e.g., position, posture, and/or changes therein).

Figure 3:
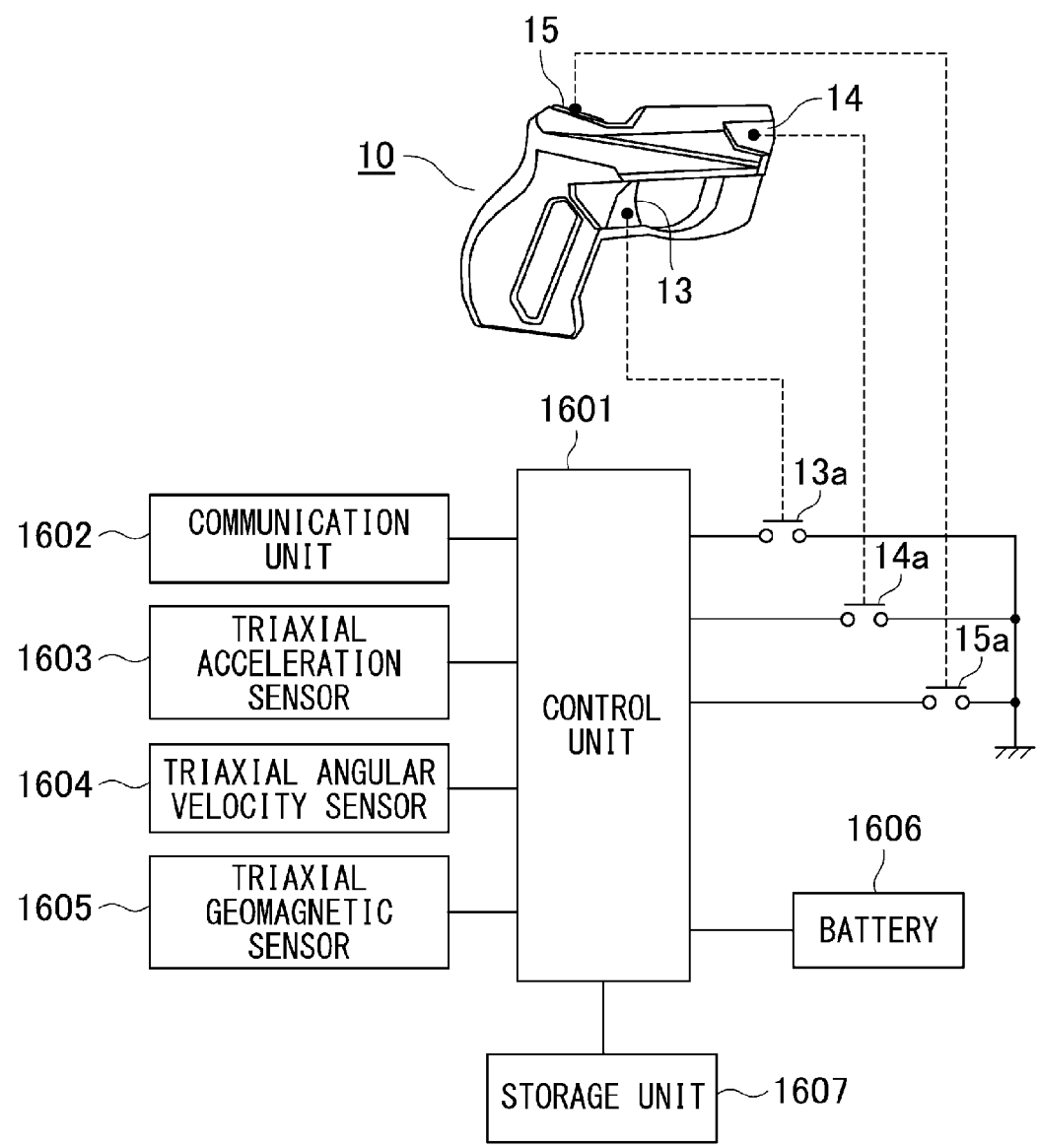
FIG. 3 is a block diagram illustrating the electrical hardware configuration of a (gun-shaped) operation unit.

FIG. 3 is a block diagram illustrating the electrical hardware configuration of a (gun-shaped) operation unit. As illustrated in FIG. 3, the electric circuitry inside the operating element includes a control unit 1601 that is constituted by a microprocessor, an ASIC, or the like and performs integrated control on the entire operating element, a communication unit 1602 that performs short range communication such as Bluetooth, three sensors that constitute the second motion sensor, namely, a triaxial acceleration sensor 1603, a triaxial angular velocity sensor 1604, and a triaxial geomagnetic sensor 1605, a battery 1606, a storage unit 1607, a first switch 13a that is turned on or off interlocking with the first operating element 13, a second switch 14a that is turned on or off interlocking with the second operating element 14, and a third switch 15a that is turned on or off interlocking with the third operating element 15.

The triaxial acceleration sensor 1603 is, as is well known to those skilled in the art, a sensor with which accelerations in three directions, an X axis, a Y axis, and a Z axis, are measured by one device, is able to detect a three dimensional acceleration can, and is available for the measurement of gravity (static acceleration). Many triaxial acceleration sensors are MEMS sensors, which are reduced in size by "Micro Electro Mechanical Systems (MEMS, also referred to as micromachines)", in which a microscopic mechanical structure is integrated on a silicon substrate by micromachining techniques such as semiconductor manufacturing techniques and laser beam machining technique. The MEMS triaxial acceleration sensors are capable of measurement within a range of ± a few g's and referred to as a "low g" type, which can follow changes in acceleration ranging from 0 Hz to a few hundred Hz. The term "0 Hz" in this case means a state where only a gravitational acceleration is applied to a sensor, when the sum of X-axis, Y-axis, and Z-axis accelerating vectors can result in the measurement of a direction with respect to the ground. The MEMS triaxial acceleration sensors are roughly categorized into three types, a semiconductor piezoresistive triaxial acceleration sensor, an electrostatic triaxial acceleration sensor, and a thermal (gas temperature profile type) triaxial acceleration sensor, which differ in method of measuring acceleration. The semiconductor piezoresistive triaxial acceleration sensors measure acceleration by detecting the distortion of a diaphragm that occurs when the acceleration acts on a weight. The electrostatic triaxial acceleration sensor measures acceleration by making use of changes in electrostatic capacitance, and the thermal (gas temperature profile type) triaxial acceleration sensor measures acceleration by making use of the displacement of gas heated by a heater.

The triaxial angular velocity sensor 1604 is, as is well known to those skilled in the art, a kind of an inertial sensor that performs the measurement of a rotation angular velocity in orthogonal three axes (X axis, Y axis, and Z axis) and is also referred to as a gyro sensor. The angular velocity sensor measures the motion of rotation, which cannot be sensed by an acceleration sensor. Gyro sensors can be categorized according to methods for sensing the rotation. At present, gyro sensors most commonly installed in consumer equipment are IC-type vibration gyro sensors using a MEMS (Micro Electro Mechanical System) technique. An inertial sensor using the MEMS technique is configured by, as its name suggests, a technique that combines an element performing mechanical movement and an electronic circuit processing a signal from the element, so as to sense movement. The types of vibration gyro sensor include an electrostatic capacitive type that uses a silicon and a piezo type that uses a crystal or the other piezoelectric materials. Gyro sensors other than the vibration type include a geomagnetic type, an optical type, and a mechanical type. The three axes are typically defined as vertical, lateral, and longitudinal axes, and in many cases the vertical axis is referred to as a "yaw axis", the lateral axis is referred to as a "pitch (pitching) axis", and the longitudinal axis is referred to as a "roll axis". All the vibration gyro sensors make use of Coriolis force (deflecting force) to sense rotation.

The triaxial geomagnetic sensor 1605 is, as is well known to those skilled in the art, a kind of a magnetic sensor and refers to a sensor that senses the direction of geomagnetism and calculates an orientation in the form of values on orthogonal three axes (X axis, Y axis, and Z axis). That is, this sensor includes first and second magnetic sensors for a longitudinal direction and a lateral direction, respectively, as well as a third geomagnetic sensor that detects geomagnetism in a vertical direction. Therefore, even when an electronic compass is inclined at an angle at which an operating element is held, the grasp of degrees at which the electronic compass is inclined enables the calculation of geomagnetism in a horizontal direction by subtracting the inclination and enables the display of a correct orientation. There are three known types of magnetic sensor element that is used in a geomagnetic sensor IC incorporated in a triaxial geomagnetic sensor. They are a magneto-resistive (MR) element, a magneto-impedance (MI) element, and a Hall element. The MR element makes use of the MR effect of, for example, a soft magnetic metallic material such as permalloy (NiFe) the resistance value of which changes with the intensity variation of an external magnetic field. The MI element makes use of the MI effect of an amorphous wire the impedance of which varies with the variation in the external magnetic field, where pulse current is caused to flow through the wire. The Hall element measures the variation in the external magnetic field by detecting a potential difference that develops by Hall effect in a semiconductor. A geomagnetic sensor IC typically incorporates such a magnetic sensor element, as well as a driving circuit, an amplifier circuit, and the like.

Figure 4:
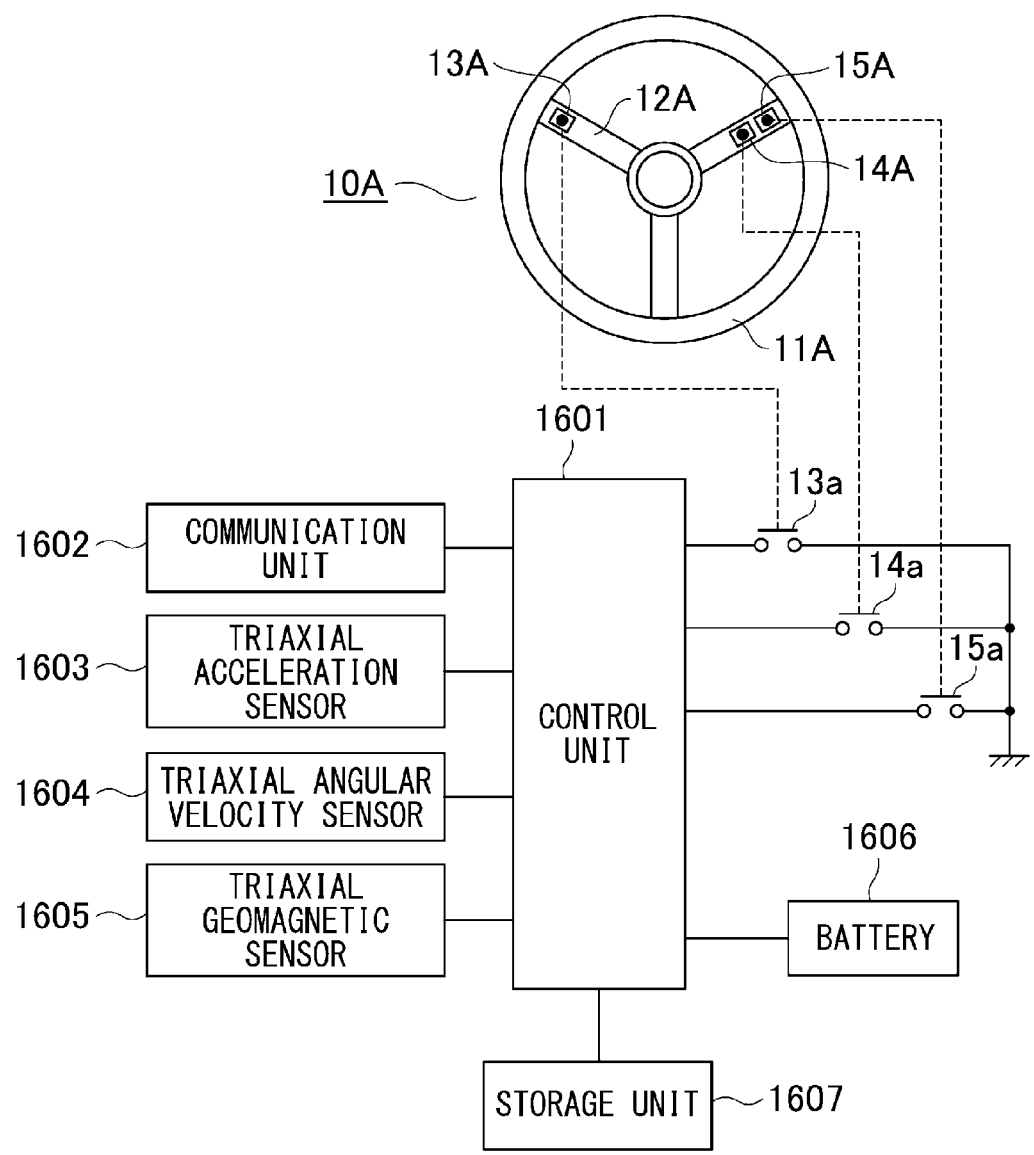
FIG. 4 is a block diagram illustrating the electrical hardware configuration of a (steering-wheel-shaped) operation unit.

Next, FIG. 4 is a block diagram illustrating the electrical hardware configuration of a (steering-wheel-shaped) operation unit. As illustrated in FIG. 4, in this example, an operation unit 10A is formed into a shape of a steering wheel of a racing car. That is, the operation unit 10A includes an annular part 11A that is a grip portion to be gripped by both hands, and three radial parts 12A. In the neutral position of the operation unit 10A, a first operating element 13A is disposed in one of the radial parts in a position at 60 degrees counterclockwise rotation, and second and third operating elements 14A and 15A are disposed in one of the radial parts in a position at 60 degrees clockwise rotation. The operating elements 13A, 14A, and 15A are each configured as a momentary-type push button. Such a steering-wheel-shaped operation unit 10A also incorporates, in the inside thereof, the above-described three sensors constituting the second motion sensor, namely, the triaxial acceleration sensor 1603, the triaxial angular velocity sensor 1604, and the triaxial geomagnetic sensor 1605. Therefore, the sensors enable unrestrictedly sensing the motion incidental to steering operation of the steering-wheel-shaped operation unit 10A (e.g., position, posture, and/or changes therein). The same components as the other units illustrated in FIG. 3 are denoted by the same reference numerals and will not be described.

Figure 5:
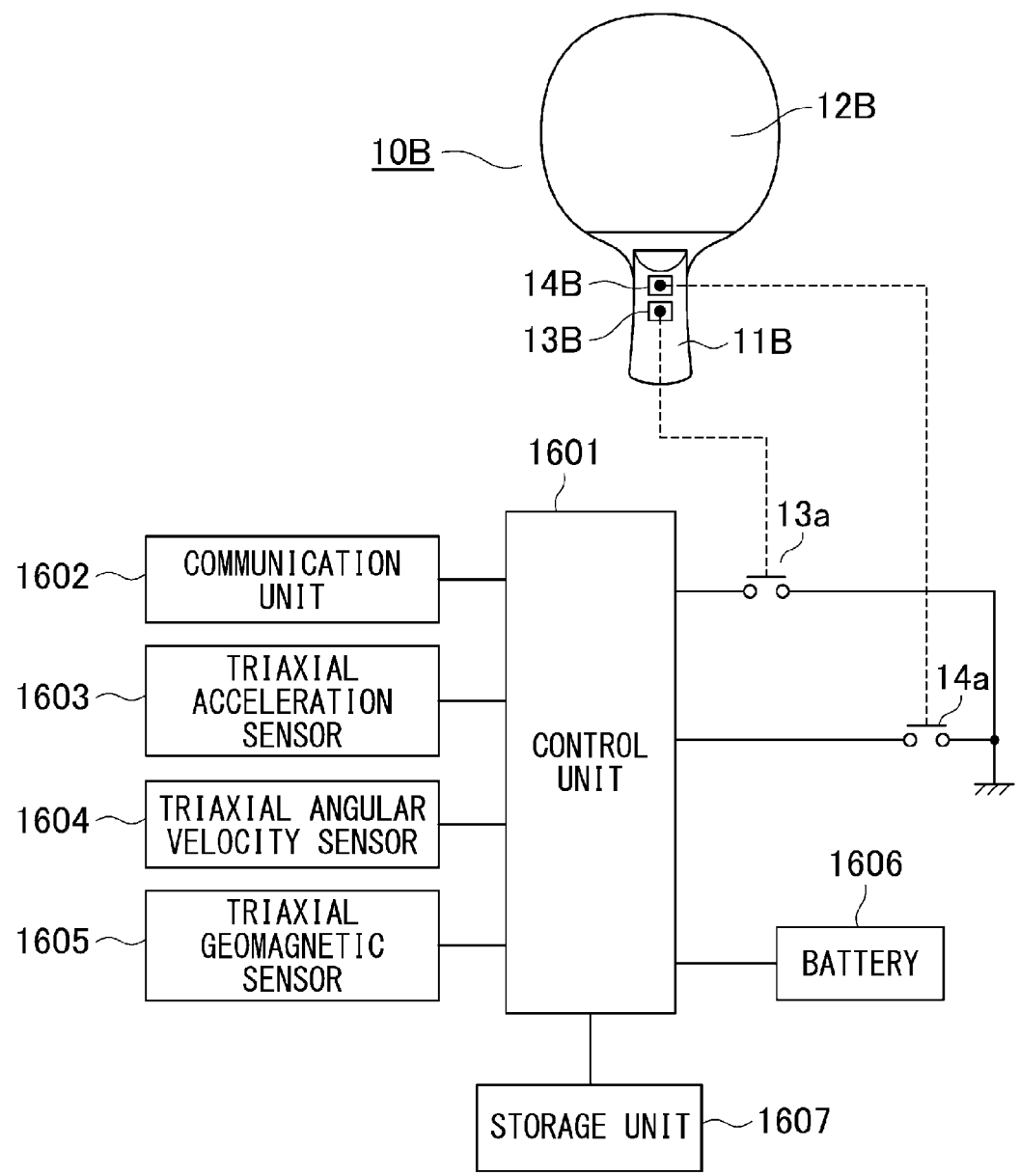
FIG. 5 is a block diagram illustrating the electrical hardware configuration of a (paddle-shaped) operation unit.

Next, FIG. 5 is a block diagram illustrating the electrical hardware configuration of a (paddle-shaped) operation unit. As illustrated in FIG. 5, in this example, an operation unit 103 is formed into a shape of a table tennis paddle. That is, the operation unit 103 includes a grip portion 113 and a blade portion 123, and in the grip portion 113, a first operating element 133 and a second operating element 143 are disposed. The operating elements 133 and 143 are each configured as a momentary-type push button. Such a paddle shaped operation unit 10B also incorporates, in the inside thereof, the above-described three sensors constituting the second motion sensor, namely, the triaxial acceleration sensor 1603, the triaxial angular velocity sensor 1604, and the triaxial geomagnetic sensor 1605. Therefore, the sensors enable unrestrictedly sensing the position, posture, and/or changes therein of the paddle-shaped operation unit 10B. The same components as the other units illustrated in FIG. 3 are denoted by the same reference numerals and will not be described.

Figure 6:
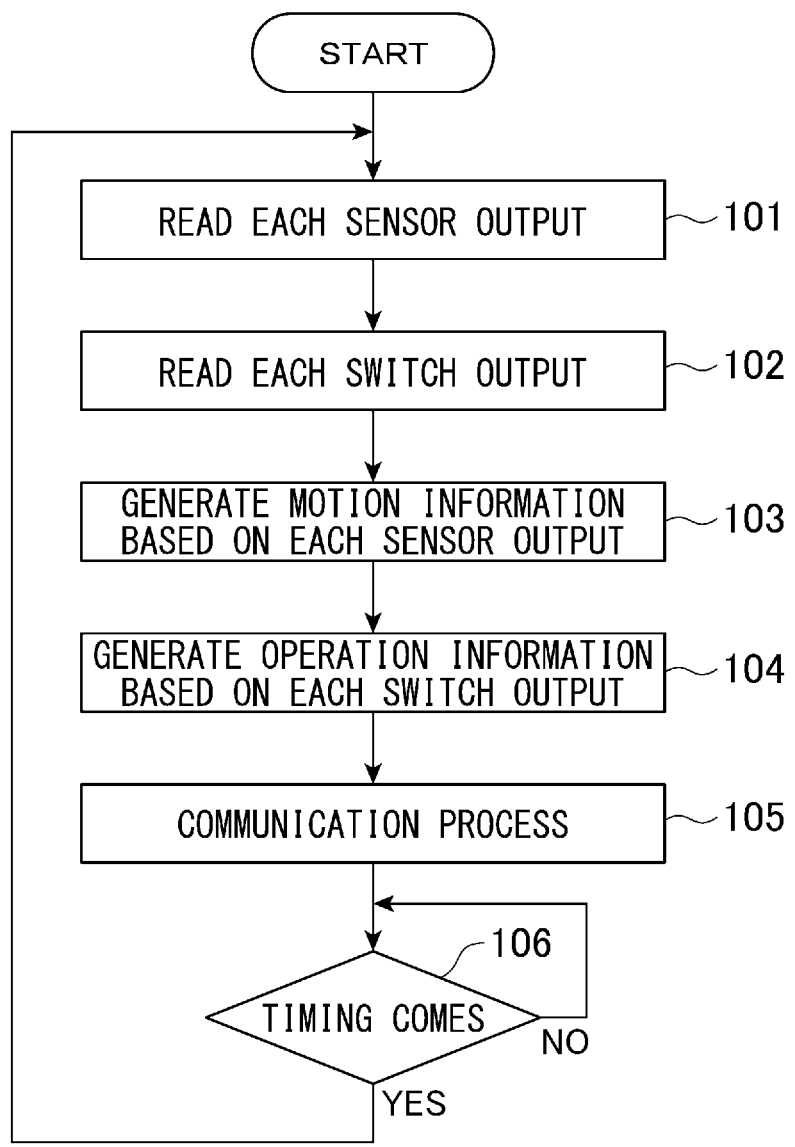
FIG. 6 is a flow chart illustrating the software configuration of the operation unit.

Next, FIG. 6 is a flow chart illustrating the software configuration of the operation unit. Note that the flow chart illustrated in FIG. 6 is the configuration of a control program that is stored in the storage unit 1607 and is to be executed by a microprocessor constituting the control unit 1601.

In FIG. 6, in step 101, each sensor output is read from the triaxial acceleration sensor 1603, the triaxial angular velocity sensor 1604, and the triaxial geomagnetic sensor 1605. In step 102, each switch output is read from the first switch 13a, the second switch 14a, and the third switch 15a. In step 103, motion information is generated based on each sensor output, the motion information indicating the operating elements positions, postures, and/or the change states thereof. In step 104, operation information is generated based on each switch output, the operation information indicating the operating states of the operating elements in the operating element. In step 105, the motion information and the operation information acquired in the above steps are transmitted to the side of the smartphone 50 through communication with the smartphone 50 constituting the information processing unit (see FIG. 7 and FIG. 8), over Bluetooth. The above series of processes (steps 101 to 106) are repeated whenever a predetermined transmission timing comes (e.g., at a frame cycle) (step 106).

[Head Mounted Tool]

Next, the configuration of the head mounted tool 20 will be described. In this example, as described above, the head mounted tool 20 incorporates the smartphone 50, which includes an image display unit 51 functioning as a display unit of the head mounted display (HMD). In addition, the first motion sensor is constituted by a triaxial acceleration sensor 506, a triaxial angular velocity sensor 507, and a triaxial geomagnetic sensor 508 that are incorporated in the smartphone 50 (see FIG. 9).

Figure 7:
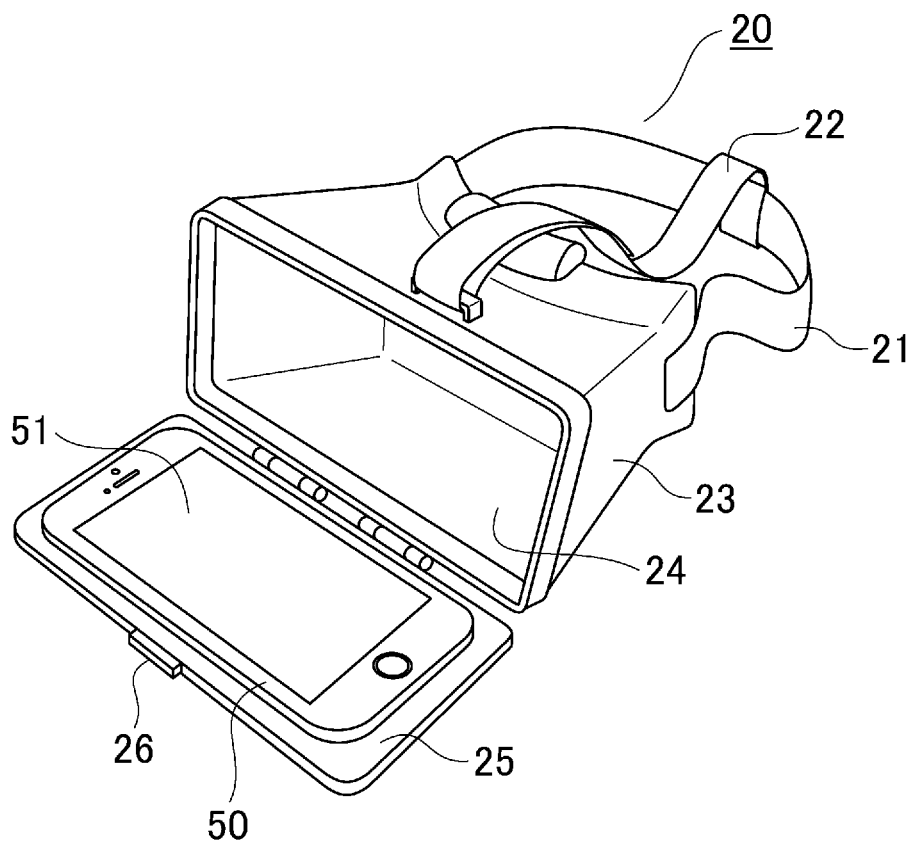
FIG. 7 is an explanatory diagram illustrating operation for incorporating a smartphone into a head mounted tool.
Figure 8:
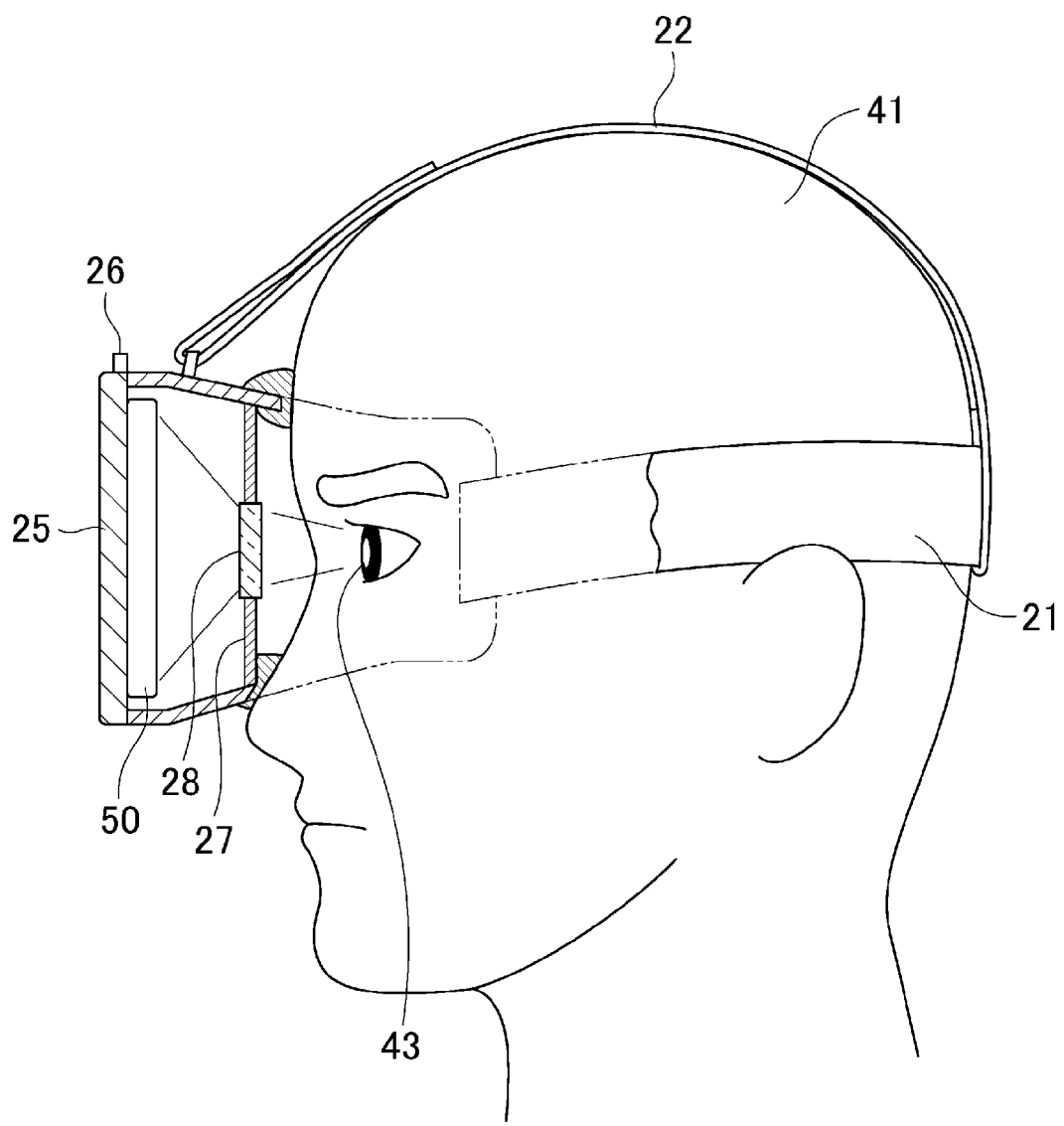
FIG. 8 is a cross sectional view of the main portion of the head mounted tool worn by an operator.

FIG. 7 is an explanatory diagram illustrating operation for incorporating the smartphone into the head mounted tool, and FIG. 8 is a cross sectional view of the main portion of the head mounted tool worn by an operator. As illustrated in FIG. 7 and FIG. 8, the head mounted portion 20 includes an opening 24 on the front face thereof and a main body 23 on the rear face thereof, the main body 23 being put to eyes 43 of the operator 40. The head mounted tool 20 includes a head-side belt 21 that is put around the head of the operator 40, and a head-top belt 22 that is put to the head-top portion of the operator 40. On the front face opening 24, a lid plate 25 configured to be opened outward is hinged to be openable and closable, and the front face opening 24 is closed with the lid plate 24 and fixed by a fastener 26. To the inner side of the lid plate 25, the smartphone 50 is fixed using a suitable retainer, with a display screen 51 turned inward.

When the operator 40 wears the head mounted tool 20 with the smartphone 50 incorporated therein on the head 41, the display screen 51 of the smartphone 50 comes face-to-face with the eyes of the operator 40 through an optical system 28 that is retained by a partition plate 27, as illustrated in. FIG. 8. Therefore, the head mounted tool 20 functions as a so-called head mounted display (HMD). Note that, as is well known to those skilled in the art, in order to display a 3D image, the landscape display screen 51 is laterally divided into two sub areas, which display respective images that have parallax to each other.

[Smartphone]

Figure 9:
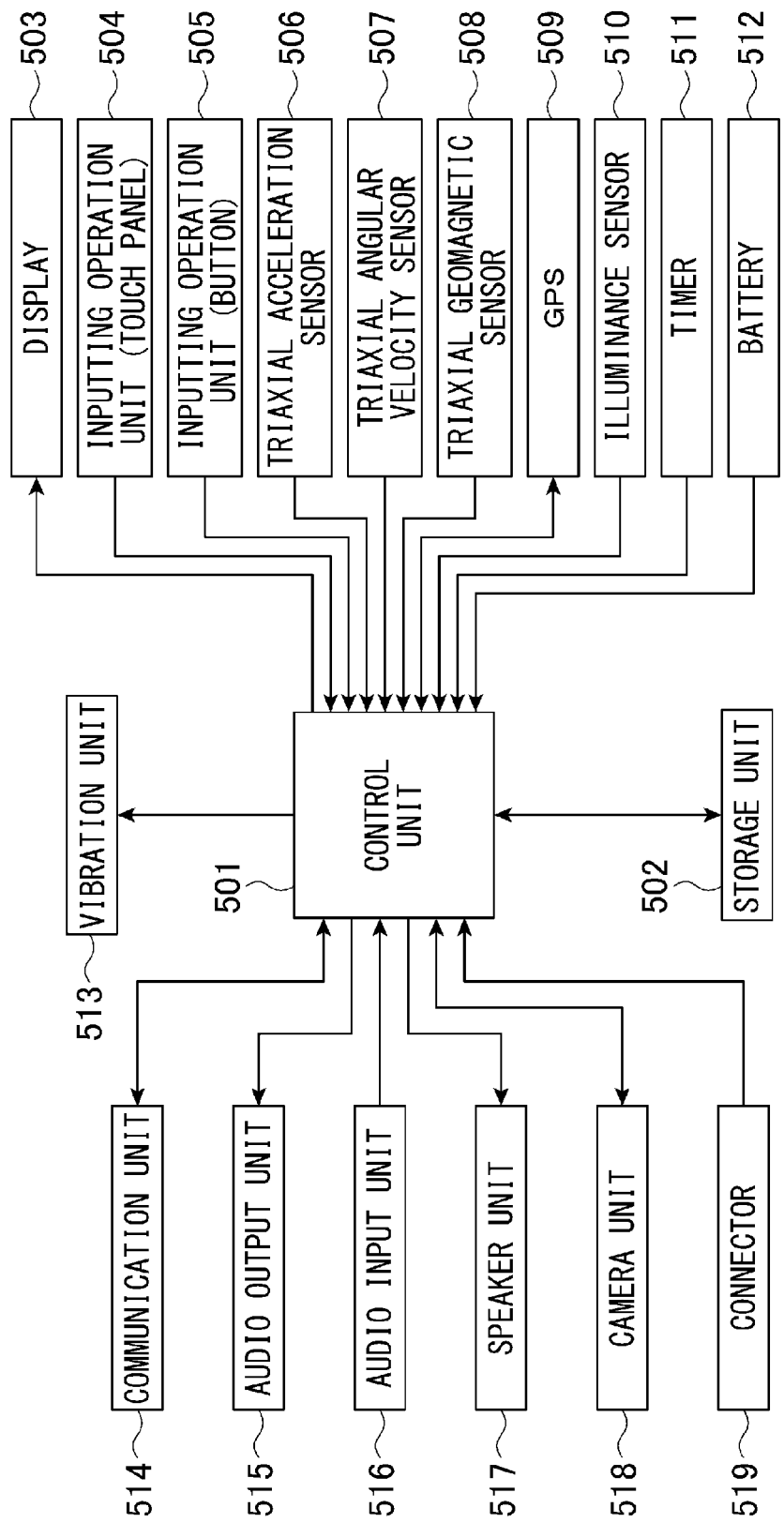
FIG. 9 is a block diagram illustrating an example of the electrical hardware configuration of a commercial smartphone.

FIG. 9 is a block diagram illustrating an example of the electrical hardware configuration of a commercial smartphone. As illustrated in FIG. 9, the electric circuitry of the smartphone 50 includes a control unit 501, a storage unit 502, a display unit 503, an inputting operation unit (a touch panel) 504, an inputting operation unit (button) 505, a triaxial acceleration sensor 506, a triaxial angular velocity sensor 507, triaxial geomagnetic sensor 508, a GPS 509, an illuminance sensor 510, a timer 511, a battery 512, a vibration unit 513, a communication unit 514, an audio output unit 515, an audio input unit 516, a speaker unit 517, a camera unit 518, and a connector 519.

The control unit 501 includes a CPU or the like (including a System-on-Chip (SoC), a Micro Control Unit (MCU), a Field-Programmable Gate Array (FPGA), and the like) that executes a program for controlling various actions and the like of the smartphone.

The storage unit 502 is constituted by a ROM, a RAM, a storage, or the like, in which a program for fulfilling a function as a video game device to be described later, as well as a downloading program selection program for supporting the download of a game program through communication, and various kinds of data are saved.

The display 503 includes a display device such as a liquid crystal display, an organic EL display, and an inorganic EL display, displaying characters, figures, symbols, and the like. In connection with the present invention, the display 503 also functions as a display unit of a head mounted display (HMD). That is, a video constituting a video game is displayed on the display screen of the display 503. The video is preferably subjected to 3D processing using a well-known technique. In order to perform 3D display, the landscape display screen of the display 503 is divided into two sub areas, which display two respective images that have parallax.

The communication unit 514 performs wireless communication with an external device over a LAN, the Internet, and the like. There are wireless communication standards such as 2G, 3G, 4G, IEEE 802.11, and Bluetooth®. Furthermore, the communication unit 514 has a built-in function of performing Bluetooth communication with the operation unit 10, 10A, or 10B, in connection with the present invention.

The speaker unit 517 outputs music or the like from the smartphone, and the speaker unit 517 is used to generate game sound, in connection with the present invention. The triaxial acceleration sensor 506 detects the direction and magnitude of acceleration that acts on a smartphone housing, the triaxial angular velocity sensor 507 detects the angle and the angular velocity of the smartphone housing, and the triaxial geomagnetic sensor 508 detects the direction of geomagnetism. The three sensors 506, 507, and 508 constitute the first motion sensor in the present invention. Then, based on the outputs from the three sensors 506, 507, and 508, the orientation of the head 41 of the operator 40 is detected.

Additionally, the vibration unit 513 is used in various application programs or the like, and can be constituted by, for example, a vibration speaker, a vibration mechanism using an electromagnetic coil, various vibrating motors, or the like. The camera unit 518 is connected to, for example, an in-camera, an out-camera, or the like provided on the front face or the back face of a terminal device housing, and is used to pick up a still image or a movie. The connector 519 is a terminal used for connection with the other device. The terminal may be a general-purpose terminal such as a USB, and an HDMI®. The audio output unit 515 performs audio output at the time of making a telephone call or the like using the smartphone. The audio input unit 516 (e.g., a microphone) performs audio input at the time of making a telephone call or the like using the smartphone. The inputting operation unit 504 is a touch-type inputting operation unit that detects a contact of a finger, a pen, a stylus pen, or the like to make various inputs. The GPS (Grand Positioning System) 509 detects the position of the smartphone. The illuminance sensor 510 detects an illuminance. Note that the illuminance refers to the intensity, brightness, or luminance of light. The timer 511 measures time. Note that the timer may be provided integrally with the CPU or the like. The battery 512 is charged to function as a power source of the smartphone.

[Program Executed by Control Unit of Smartphone]

Figure 10:
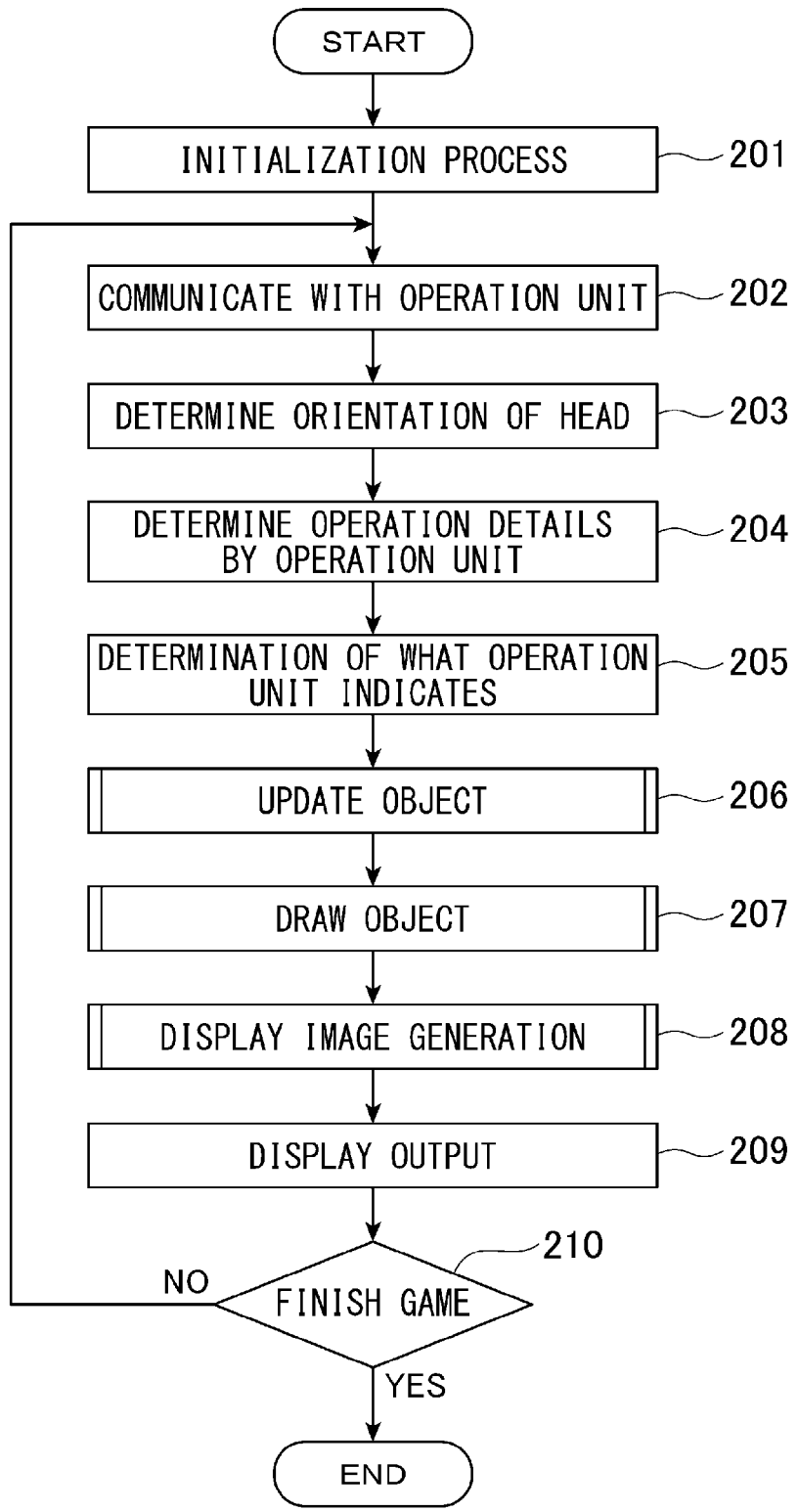
FIG. 10 is a flow chart illustrating the software configuration of a video game device.

FIG. 10 is a flow chart illustrating the software configuration of the video game device. Note that the flow chart corresponds to a program to be executed by the control unit 501 of the smartphone 50.

In FIG. 10, in step 201, an initialization process is executed, in which initial setting is performed on various flags, registers, and the like prior to the start of a game, and initial setting, calibration, and the like are performed, as needed, on the first motion sensor (the triaxial acceleration sensor 506, the triaxial angular velocity sensor 507, and the triaxial geomagnetic sensor 508) incorporated in the smartphone 50, and the second motion sensor (the triaxial acceleration sensor 1603, the triaxial angular velocity sensor 1604, and the triaxial geomagnetic sensor 1605) incorporated in the operation unit 10, in connection with the present invention.

Subsequently, a series of processes (steps 202 to 209) are repeatedly executed every predetermined cycle (e.g., every one frame time). First, in step 202, motion information and operation information generated by the operation unit 10 are read through Bluetooth communication with the operation unit 10. In subsequent step 203, the orientation of the head 41 of the operator 40 is determined based on the motion information from the first motion sensor (the triaxial acceleration sensor 506, the triaxial angular velocity sensor 507, and the triaxial geomagnetic sensor 508) incorporated in the smartphone 50. In subsequent step 204, operation details of the operation unit (about how the operating elements 13, 14, 15 are operated) are determined based on the operation information read from the operation unit 10. In subsequent step 205, determination as to whether the operation unit indicates a "direction" or a "movement" is made based on the motion information read from the operation unit 10. Afterward, an object updating process (step 206), an object drawing process (step 207), and a display image generating process (step 208) conforming to the type of the game are executed in order.

Here, the object updating process (step 206) means, as is well known to those skilled in the art, the execution of required update processes (e.g., updating an opponent, updating a player character or vehicle, updating a background, updating an obstacle, updating an effect, and the like) in accordance with the type of the game. Similarly, the object drawing process (step 207) means the execution of required drawing processes (e.g., drawing an opponent, drawing a player character or vehicle, drawing a background, drawing an obstacle, drawing an effect, and the like). Furthermore, the display image generating process (step 208) is a process for fulfilling a head tracking displaying function, which basically includes the extraction of an image in a predetermined angle-of-view frame G (see FIG. 14) from given panoramic image information, the image corresponding to and facing the orientation of the head 41 of the operator 40 determined based on the motion information from the first motion sensor incorporated in the smartphone 50, and the generation of the image as a display image. The above processes (steps 202 to 208) are repeatedly executed until the end of the game (YES in step 210).

[Relevant Details of Object Updating Process]

Figure 11:
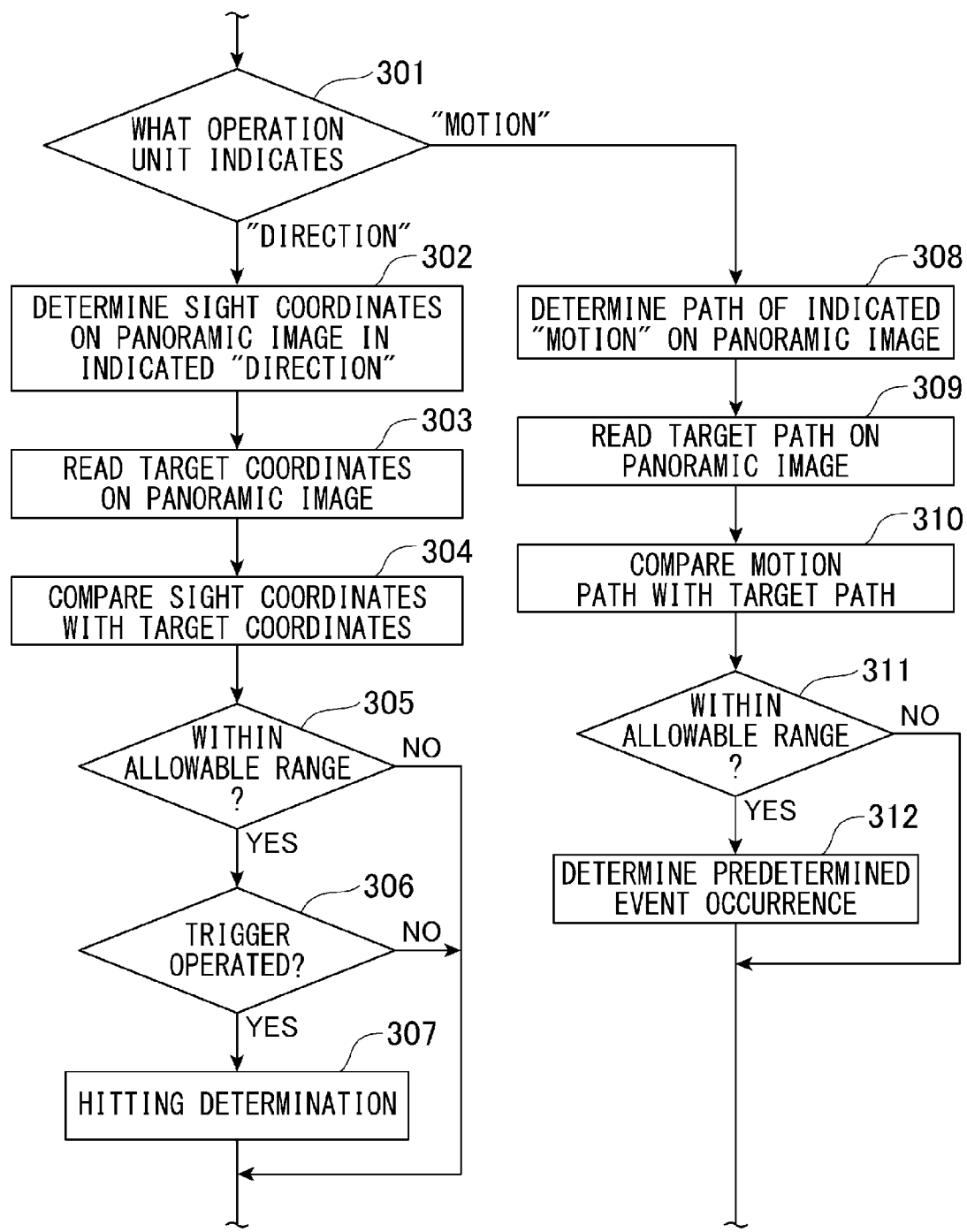
FIG. 11 is a flow chart illustrating relevant details of an example of an object updating process.

FIG. 11 is a flow chart illustrating relevant details of an example of the object updating process. As illustrated in FIG. 11, in the object updating process, one of two chains of processes is selectively executed at a certain time point according to whether the indication of the operation unit is a "direction" or a "movement".

That is, in the case where the indication is determined to be a "direction" ("DIRECTION" in step 301), first in step 302, sight coordinates are specified on a panoramic image in the indicated "direction". In subsequent step 303, predetermined target coordinates on the panoramic image are read. In subsequent step 304, the sight coordinates specified in such a manner and the read target coordinates are compared. In subsequent step 305, it is determined whether or not the sight coordinates coincides with the target coordinates within a predetermined allowable range. When the coincidence is here determined (YES in step 305), the presence/absence of a trigger operation (an operation of pulling a trigger) is determined in subsequent step 306 based on the operation information that is read in advance from an operating element. When it is determined here that a trigger operation is present (YES in step 306), a hitting determination is made in subsequent step 307. In contrast, when the coincidence is out of the allowable range (NO in step 305), or when the coincidence is within the allowable range (YES in step 305), but the trigger operation is determined to be absent (No in step 306), the hitting determination is not made. The hitting determination here means, in a shooter game, for example, a bullet shot from a gun by an operator hitting an opponent.

In contrast, in the case where the indication is determined to be a "movement" ("MOVEMENT" in step 301), first in step 308, a path of the indicated "movement" on a panoramic image is specified. In subsequent step 309, a predetermined target path on the panoramic image is read. In subsequent step 310, the specified movement path and the read target path are compared. In subsequent step 311, it is determined whether or not the specified movement path coincides with the read target path within a predetermined allowable range. When the coincidence is here determined (YES in step 311), it is determined that a predetermined event occurs. In contrast, when the coincidence is out of the allowable range (NO in step 311), an event occurrence determination is not made. The predetermined event means, in a table tennis game, a baseball game, a golf game, or the like involving a ball-hitting action, for example, that a swing action of an operator coincides with a predetermined target swing action within an allowable range, and a ball-hitting action (e.g., a table tennis paddle striking a ball, a baseball bat striking a ball, a golf club striking a ball, and the like) are properly performed.

[Details of Object Drawing Process]

Figure 12:
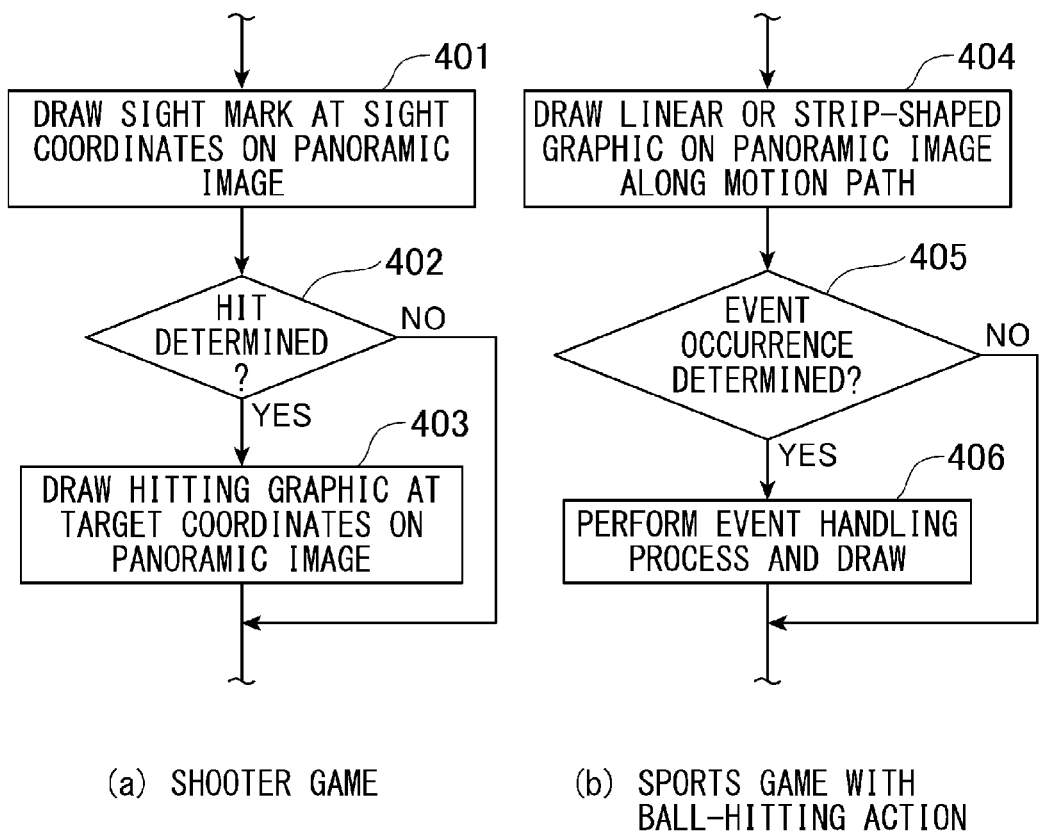
FIG. 12 is a flow chart illustrating relevant details of an example of an object drawing process.

FIG. 12 is a flow chart illustrating relevant details of an example of the object drawing process. As illustrated in FIG. 12, in the object drawing process, a drawing process conforming to the above-mentioned update processing is executed at a certain time point.

That is, in a shooter game, for example, as illustrated in FIG. 12(a), a sight mark is drawn at sight coordinates on a panoramic image in step 401. In subsequent step 402, it is determined whether or not a hitting determination is made, and when the hitting determination is made (YES in step 402), a hitting graphic is drawn at the target coordinates on the panoramic image in step 403. The "hitting graphic" here means, for example, a still image or a video corresponding to a change of a target caused by a shot bullet hitting a target (e.g., a change such as smashing an object corresponding to the target to pieces). In contrast, when the hitting determination is not made (NO in step 402), the drawing process (step 403) is skipped.

In contrast, in a sports game involving a ball-hitting action, as illustrated in FIG. 12(b), a linear or strip-shaped graphic is drawn along the movement path on the panoramic image in step 404. The "linear or strip-shaped graphic" here means, for example, a swing path of a table tennis paddle, a swing path of a baseball bat, or a swing path of the end of a golf club. In particular, in a golf game, a residual image of such a swing path is preferable for the estimation of a swing. In subsequent step 405, when an event occurrence is determined to be present (YES in step 405), the execution of an event handling process and drawing are performed (step 406). The "event handling process" here means, in a table tennis game or a baseball game, for example, a still image or a video that shows where a returned ball is going, or in a golf game, a still image or a video that shows where a hit ball is going. In contrast, when the event occurrence is determined to be absent (NO in step 405), the execution of the event handling process, and drawing are skipped.

[Details of Display Image Generating Process]

Figure 13:
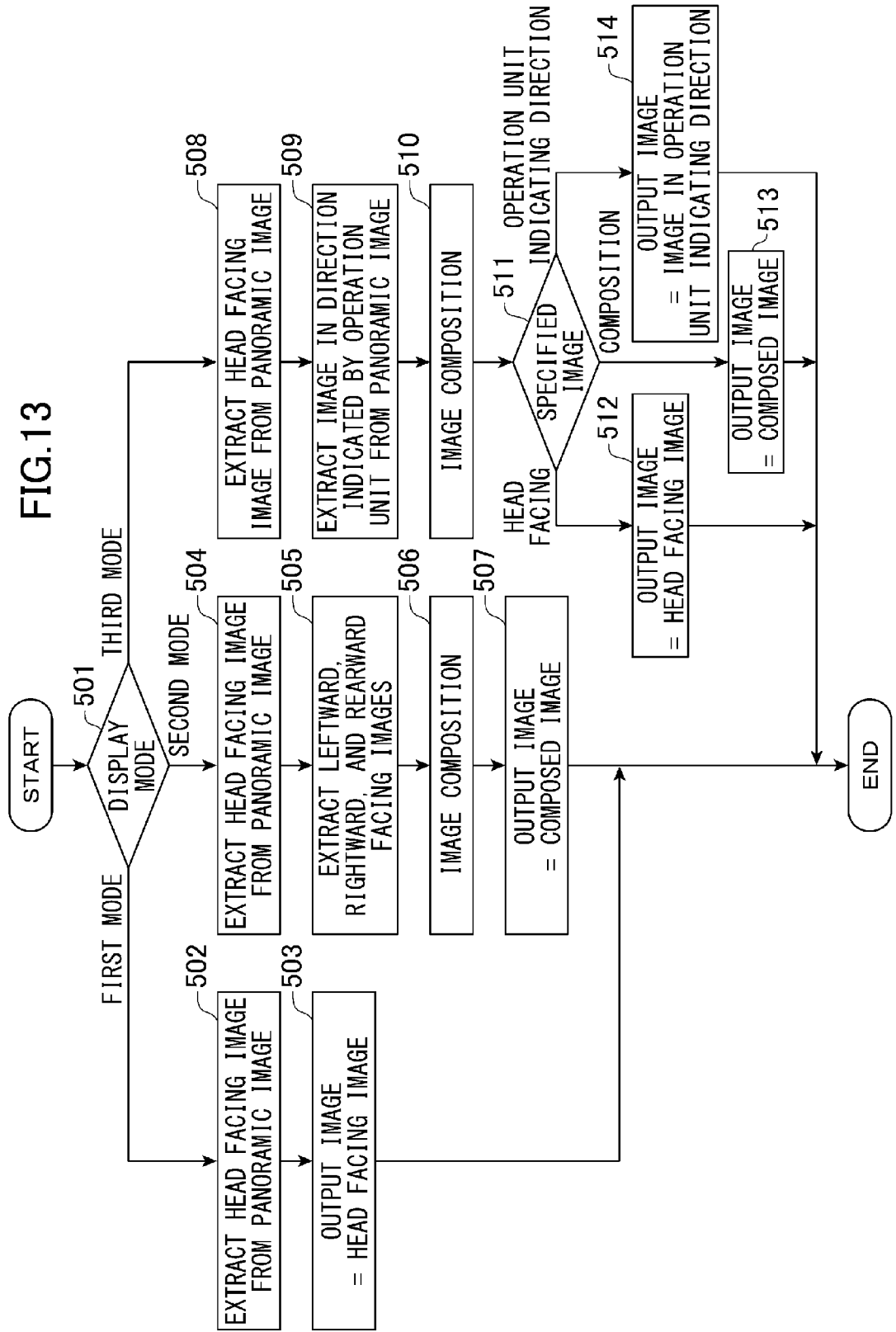
FIG. 13 is a flow chart illustrating details of a display image generating process.

FIG. 13 is a flow chart illustrating details of the display image generating process. As illustrated in FIG. 13, in this example, there are three prepared modes including first to third modes. One of the three modes can be selected in accordance with a predetermined operation of an operating element in the operation unit 10.

When the display mode is the first mode ("FIRST MODE" in step 501), a head facing image is extracted in step 502 from the panoramic image in accordance with the orientation of the head of an operator that is determined based on motion information acquired from the first motion sensor incorporated in the smartphone. In this case, the head facing image extracted in such a manner is determined as an output image being kept unchanged.

When the display mode is the second mode ("SECOND MODE" in step 501), a head facing image is extracted in step 504 from a panoramic image, as in step 502. In subsequent step 505, leftward, rightward, and rearward facing images are extracted, with the orientation of the head defined as a criterion. In subsequent step 506, the four images (the head facing image, the leftward image, the rightward image, and the rearward image) are composed so as to be projected on the same display screen. In this case, the composed image generated in such a manner is determined as an output image being kept unchanged.

When the display mode is the third mode ("THIRD MODE" in step 501), a head facing image is extracted in step 508 from a panoramic image, as in step 502. In subsequent step 509, an image in the direction indicated by an operating element is extracted from the panoramic image in accordance with the direction indicated by an operator that is determined based on motion information acquired from the second motion sensor incorporated in the operating element. In subsequent step 510, the head facing image and the image in the direction indicated by the operating element are composed so as to be projected on the same display screen.

In subsequent step 511, it is determined which image is specified from among "head facing", "composition", and "orientation of operation unit", by the operator operating an operating element of the operating element. Here, when the operator specifies "head facing", the head facing image is determined in step 512 as an output image being kept unchanged. Alternatively, when the operator specifies "composition", the composed image of the head facing image and the image in the direction indicated by the operating element is determined in step 513 as an output image being kept unchanged. Furthermore, when the operator specifies "operating element indicating direction", the image in the direction indicated by the operating element is determined in step 514 as an output image being kept unchanged.

Referring back to FIG. 10, on the display outputting process (step 209), well-known 3D conversion processing is performed as needed on the output image determined on the display image generating process (step 208), and thereafter the output image is sent to the display device 503 incorporated in the smartphone, which causes a 3D conversion image constituting the video game to be displayed on the display screen 51 of the smartphone.

[Mutual Relation Between Detection Coordinate Spaces of First and Second Motion Sensors]

FIG. 14 is an explanatory diagram illustrating the relation between the detection coordinate space of the first motion sensor and the detection coordinate space of the second motion sensor. Note that, in FIG. 14, reference character G denotes a predetermined angle-of-view frame that faces the orientation of the head of the operator. An image in the angle of view G is extracted from a panoramic image and displayed as a basic image on the display screen 51.

As illustrated in FIG. 14(a), the detection coordinate space of the first motion sensor incorporated in the head mounted tool 20 is defined by an x axis, a y axis, and a z axis, which are three orthogonal axes. In addition, as illustrated in FIG. 14(b), the detection coordinate space of the second motion sensor incorporated in the operation unit 10 is defined by an X axis, a Y axis, and a Z axis, which are three orthogonal axes. Here, as illustrated in FIG. 14(c), the x axis and the X axis, the y axis and the Y axis, and the z axis and the Z axis are set in such a relation that directions of each pair of axes are aligned. In other words, a local coordinate system (x,y,z) that defines the hemispherical detection coordinate space of the first motion sensor, a local coordinate system (X,Y,Z) that defines the hemispherical detection coordinate space of the second motion sensor, and a world coordinate system (not illustrated) that defines a hemispherical coordinate space where a hemispherical panoramic image is disposed are set in such a relation that they share the origin and the respective directional axes to be aligned with each other. This means that the sense of direction or the sense of movement perceived by an operator wearing the head mounted tool 20 through the sense of sight in a virtual space perfectly matches the sense of direction or the sense of movement through which the operator indicates a direction or a movement by manipulating an operating element in a real space. Therefore, displaying the direction or the movement indicated by the operator, determined based on the motion information from the first motion sensor incorporated in the operating element, on a panoramic image constituting the virtual space enables the operator to freely manipulate various tools (e.g., a shooting tool such as a gun in a shooter game, a steering tool such as a steering wheel in a racing game, or a ball-hitting tool such as a paddle, a bat, or a golf club in a sports game involving ball hitting) in the virtual space while turning the line of sight in any direction, and it is thus possible to further increase the pleasure in the video games of these kinds.

Figure 15:
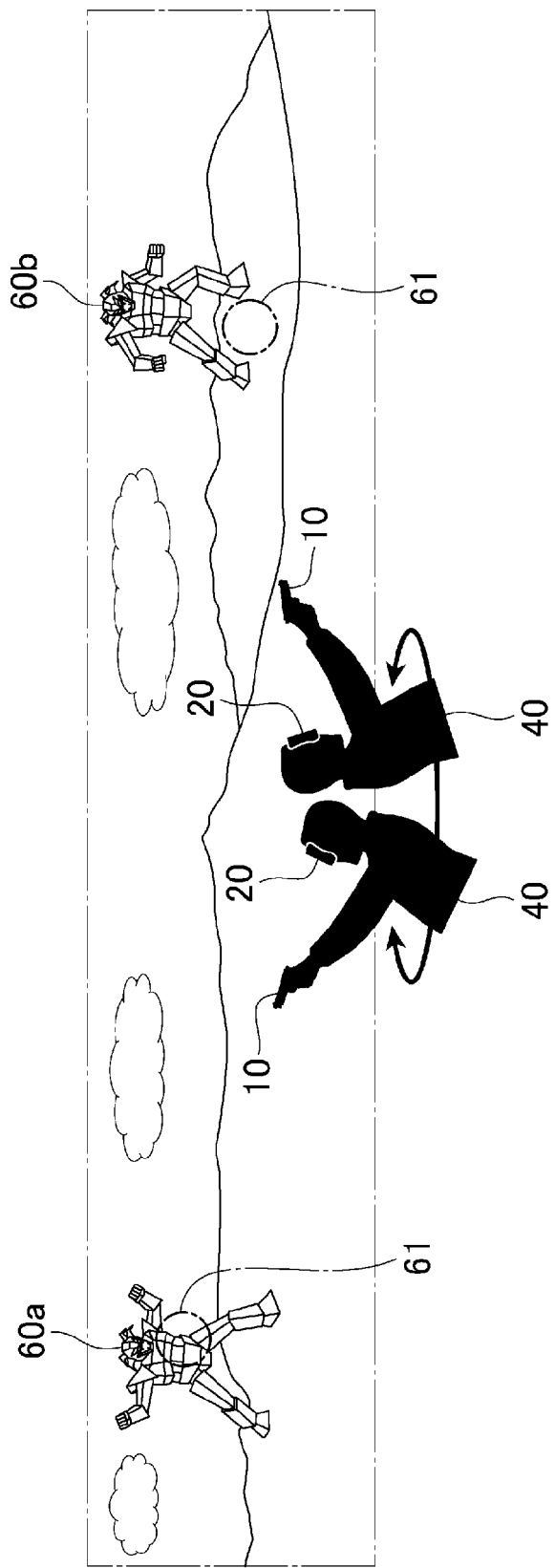
FIG. 15 is an explanatory diagram illustrating the relation between a sighting action of an operator and a sight mark on a panoramic image in a virtual space constituted by a 360-degree panoramic image.
Figure 16:
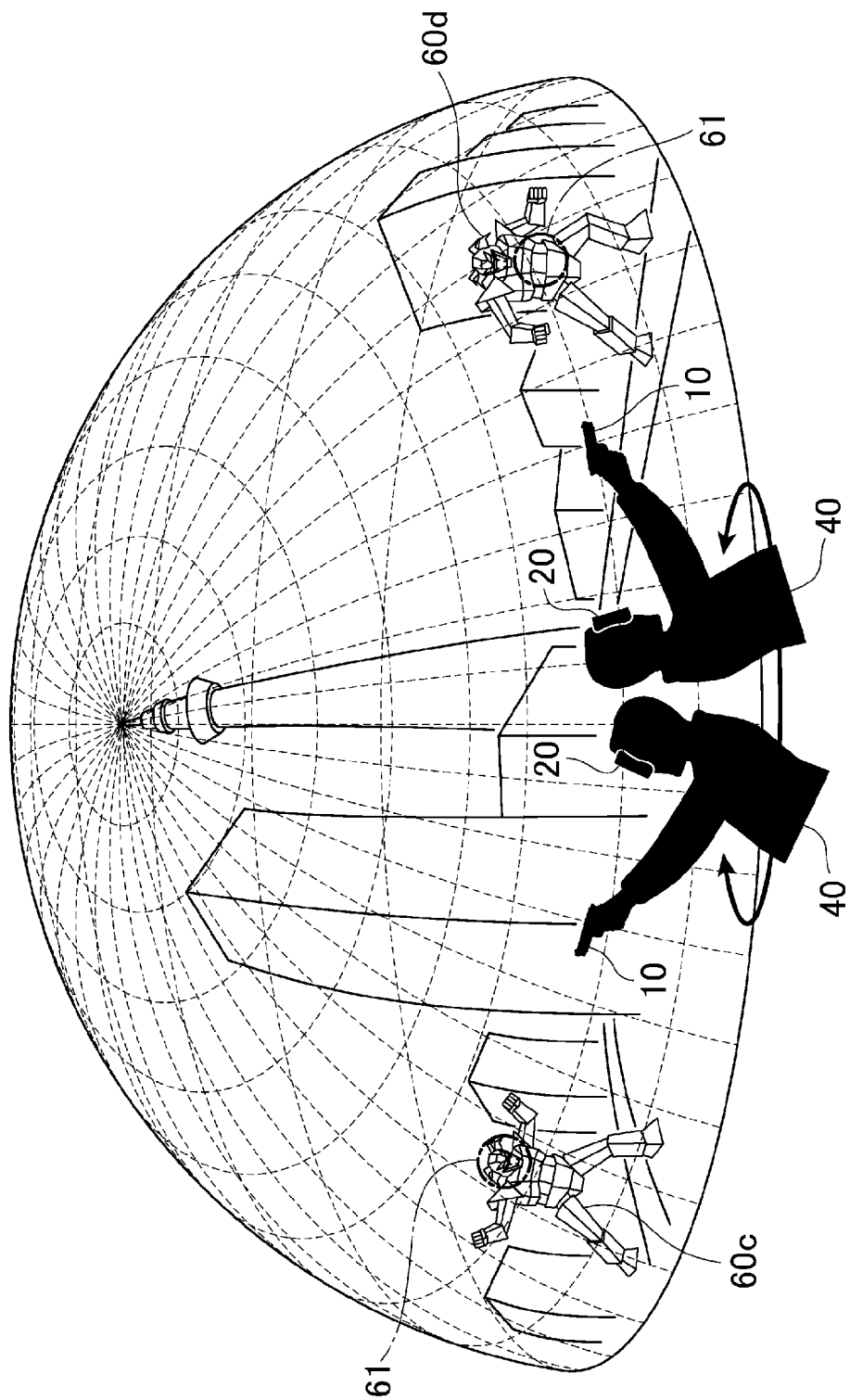
FIG. 16 is an explanatory diagram illustrating the relation between a sighting action of an operator and a sight mark on a panoramic image in a virtual space constituted by a hemispherical panoramic image.

FIG. 15 and FIG. 16 are explanatory diagrams illustrating, as a typical example, the relation between a sighting action of an operator and a sight mark on a panoramic image in virtual spaces constituted by a 360-degree panoramic image and a hemispherical panoramic image, respectively.

As is obvious from these drawings, for example, when the operator 40 turns the whole body thereof over horizontal 360 degrees, squarely holding the gun-shaped operation unit 10, a sight mark 61 is drawn on a panoramic image on the extension of the sight of the gun-shaped operation unit 10. Therefore, the operator 40 manipulates the gun-shaped operation unit 10 at will while turning the line of sight in any direction in the virtual space constituted by the 360-degree panoramic image and the hemispherical panoramic image, and adjusts the sight to target graphics 60a and 60b, enabling the pleasure in the shooter game to be increased.

[Specific Example of Computation for Aligning Detection Coordinate Spaces]
<Outline>

It is assumed that there are a terminal device (a smartphone) and a gun device (a gun-shaped operation unit) in one world coordinate space, and a motion sensor is incorporated in each device. Here, each motion sensor is constituted by a triaxial acceleration sensor, a triaxial angular velocity sensor, and a triaxial geomagnetic sensor. Each device can calculate the basic posture thereof using the triaxial acceleration sensor and the triaxial geomagnetic sensor. The posture of the device after moving is calculated by correcting the above-mentioned basic posture using the sensing result of the triaxial angular velocity sensor.
<Specific Computation (Written in Programming Language)>
First Step:

Using the triaxial acceleration sensor and the triaxial angular velocity sensor incorporated in each device, the posture of the terminal device and the posture of the gun device are calculated, and the postures are defined as the basic postures of the respective devices. Note that, even without the triaxial angular velocity sensor, posture control is possible using the triaxial acceleration sensor and the triaxial geomagnetic sensor.

(1) The reference posture calculated from values from the triaxial acceleration sensor is as follows. Note that the values from the triaxial acceleration sensor are split into a static component and a dynamic component through a low-pass filter and a high-pass filter, and what is acquired here is the static component.

sensor_pose=Quaternion(−_mAccel.Pose.z,_mAccel.Pose.y,−_mAccel.Pose.w);

(2) Changes in values from the triaxial angular velocity sensor are corrected with respect to the previous posture as follows.

Quaternion rotation=this.transform.rotation;

Quaternion qx=Quaternion.AngleAxis(−gyro.RotZ, Vector3.1

Quaternion qy=Quaternion.AngleAxis(−gyro.RotY, Vector3.up);

Quaternion qz=Quaternion,AngleAxis(−gyro.RotX, Vector3.forward);

q=(qz*qy*qx);

rotation=rotation*q;

Quaternion sensor_pose=clSingleton<clBLESensorManager>.instance.SenserPose;

this.transform.rotation=Quaternion.Slerp(rotation, sensor_pose,0.04f);

Second Step:

Using the triaxial acceleration sensor and the triaxial geomagnetic sensor, the magnetic north direction of each object is calculated from the triaxial geomagnetic sensor.

At this point, to calculate the magnetic north of a gun object, components from the triaxial geomagnetic sensor contains inclination information, and thus the geomagnetic sensor information is corrected to compensate for the inclination of the terminal calculated from the acceleration, so as to extract a horizontal geomagnetism component.

(1) The gravity vector from the triaxial acceleration sensor is expressed as follows.

Vector3b=Vector3(−mAccel.Gravity.x,_mAccel.Gravity.y,_mAccel.Gravity.z);

b=b.normalized;

(2) The vector of the vertically downward direction is expressed as follows.

Vector3 a=Vector3(0f,1f,0f);

a=a.normalized;

float value=a.x*b.z+ay*b.y+a.z b,z;

float gravity_angle=Mathf.A cos(value/a.magnitude*b.magnitude);

Vector 3 axis=Vector 3.Cross(a,b);

axis=axis.normalized

Quaternion aq=Quaternion.AngleAxis(−gravity_angle*Mathf.Rad2Deg, axis);

(3) The axis of geomagnetism (mGoem.Z, _mGeom.X, _mGeom,Y) is rotated in such a manner make a vector (0, 1, 0) upward.

Vector3geom_v=new Vector3(-_mGeom.Z,
_mGeom.Y,-_mGeom.X);

geom_v=geom_v.normalized;

(4) The inclination of the acceleration is aligned with the axis of geomagnetism.

Quaternion gq=Quaternion(-aq.z,-aq.x,aq.y,aq,w);

(5) The x, y, z components of geomagnetism are further decomposed to calculate the magnetic north in the horizontal direction.

float m=Mathf.Sqrt(Mathf.Pow(geom.x,2)+Mathf.Pow
(geom.y,2)+Mathf.Pow(geom,z,2));

geom_height=Mathf.A sin(geom.z/m);

(6) The magnetic north calculated from the horizontal component of geomagnetism is expressed as follows.

geom_height_head=Mathf.A cos(geom.x/
(m*Mathf.Cos(geom_height)));

Third Step:

The magnetic north direction of each object calculated in Second Step and the basic posture of each object are composed. At this point, the posture and the orientation of each object in the world space can be found.

(1) Rotation calculation is performed based on the orientation and the reference posture.

sensorRotation=q_head*pose;

Fourth Step

The world coordinates of an end point, being a given distance away in a forward direction from a current posture of the gun object, is calculated based on posture information on the gun object calculated in Third Step. Note that if the above calculated end point exists in the visual field of a camera of a terminal object, the world coordinates are converted into viewport coordinates of the camera (range: 0.0 to 1.0). The coordinates in a 2D coordinate system are used as 2D coordinates of the sight of the gun on the camera. When the viewport coordinates are out of the range of 0.0 to 1.0, the sight is determined to be out of screen and is not displayed.

Vector3ray_s_pos=gameObject.transform.position;
_gunRay,SetPosition(0,ray_s_pos);

Vector3
ray_e_pos=gameObject.transform.forward*kRayLength;

(1) The position of the end point is converted into current viewport coordinates (0.0 to 1.0) of the camera.

Vector2v2=ViewPortPos(r_e_pos);

(2) The viewport coordinates are corrected by converting them into coordinates in a coordinate system the center of which is zero.

Vector3target_pos=_basePos+new Vector3((v2.x-
0.5f),(v2.y-0.5f),0.0f);

(3) The sight is moved from the current position toward the calculated next position.

this.transform,position=Vector3.MoveTowards(this.
transform,position,target_pos,0.5f);

[Relation Between Action by Operator and Picture on Display Screen]

Figure 17:
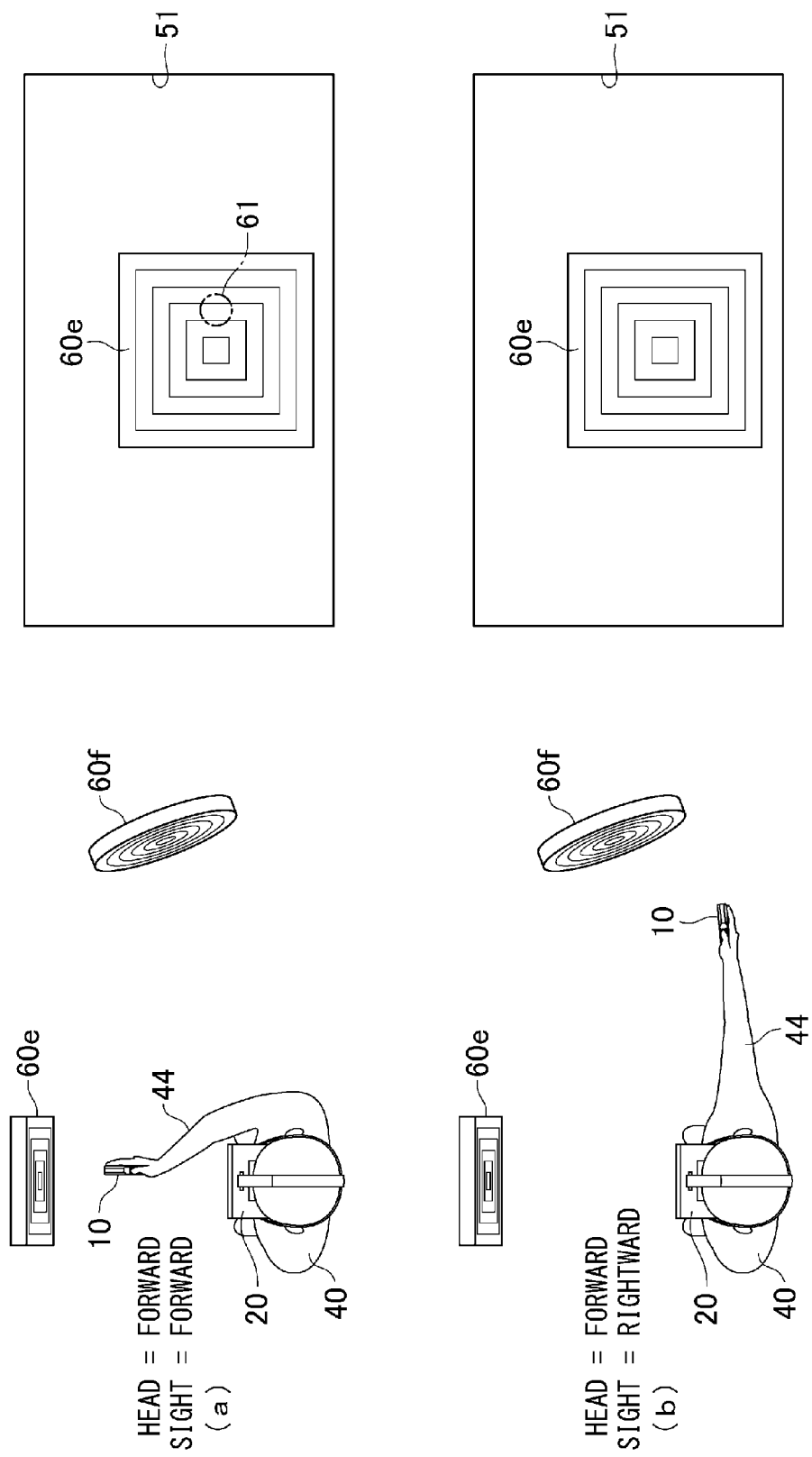
FIG. 17 is a (first) explanatory diagram illustrating the relation between an action by an operator and a picture on a display screen.

FIG. 17 is a (first) explanatory diagram illustrating the relation between an action by an operator and a picture on a display screen. This corresponds to the action in the first display mode of the flow chart illustrated in FIG. 13. Now assume that 7, target 60*e* exists forward of the operator 40, and a target 60*f* exists rightward thereof, in a virtual space of a shooter game perceived by the operator 40 through an HMD.

At this point, as illustrated in the left half of FIG. 17(*a*), when the head of the operator 40 is oriented forward, and the sight of the gun-shaped operation unit 10 is also oriented forward, the target 60*e* and the sight mark 61 existing forward are displayed together on the display screen 51, as illustrated in the right half of FIG. 17(*a*). In contrast, as illustrated in the left half of FIG. 17(*b*), when the head of the operator 40 oriented forward, and the sight of the gun-shaped operation unit 10 is oriented rightward, the target 60*e* existing forward is displayed on the display screen 51 but the sight mark 61 is not displayed, as illustrated in the right half of FIG. 17(*b*). However, even in this state, the object updating process (step 206) is executed, which thus allows a shooting action to be performed on the target 60*f* existing rightward. That is, even an invisible opponent can be hit by aiming the sight in the direction thereto and pulling a trigger. The hitting can be confirmed by, for example, sound effects from the smartphone.

Next, FIG. 18 is a (second) explanatory diagram illustrating the relation between an action by an operator and a picture on a display screen. This also corresponds to the action in the first display mode of the flow chart illustrated in FIG. 13. Note that the assumption about the target arrangement in the virtual space and the details of FIG. 18(*a*) are the same as the details of FIG. 17 described above and will not be described.

In contrast, as illustrated in the left half of FIG. 18(*b*), when the head of the operator 40 is oriented rightward, and the sight of the gun-shaped operation unit 10 is oriented forward, only the target 60*f* existing rightward is displayed on the display screen 51, and the target 60*e* and the sight mark 61 existing forward are not displayed, as illustrated in the right half of FIG. 18(*a*). In such a manner, it is possible to search for an opponent while looking around with the sight aimed forward.

Figure 19:
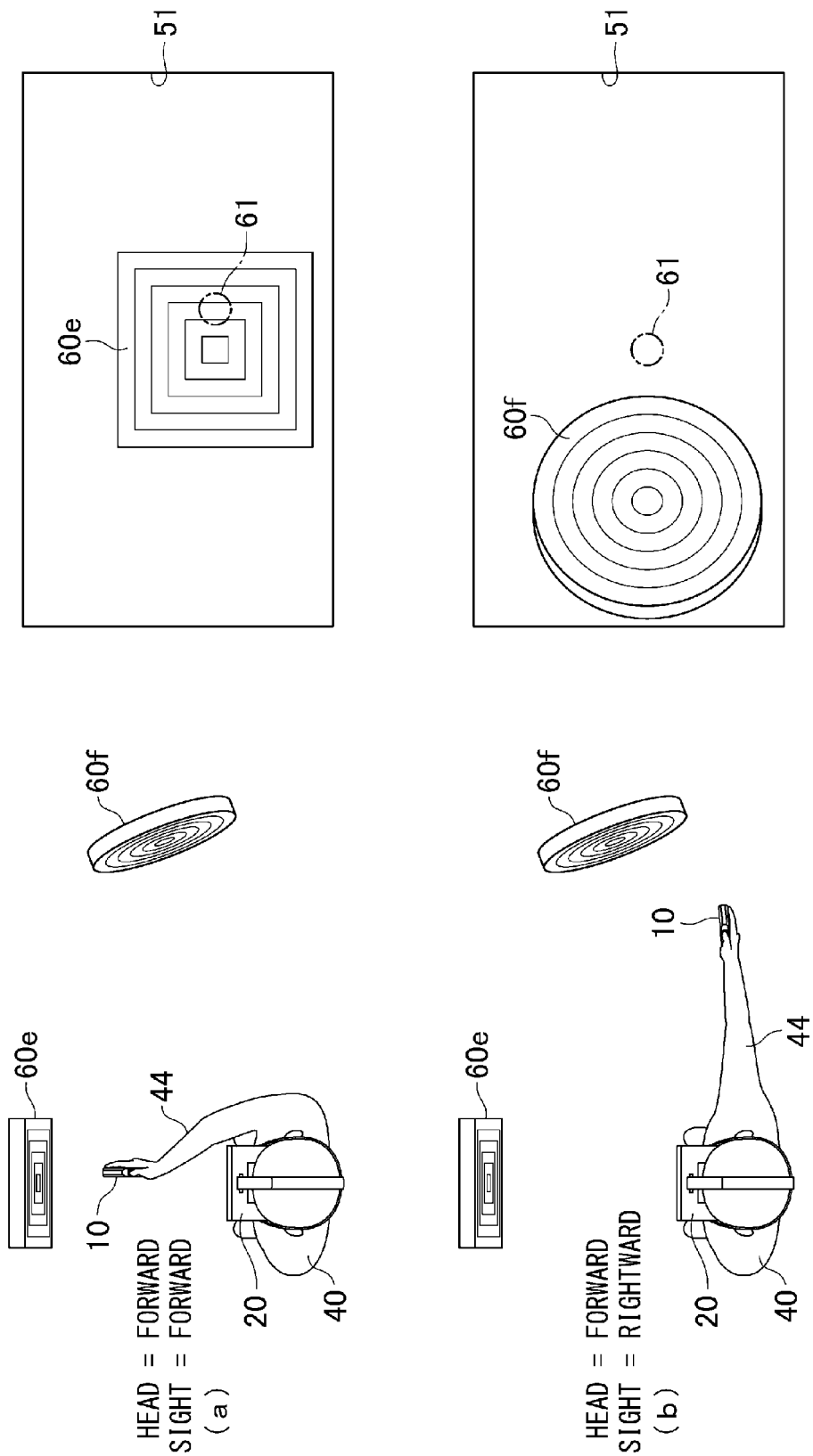
FIG. 19 is a (third) explanatory diagram illustrating the relation between an action by an operator and a picture on a display screen.

Next, FIG. 19 is a (third) explanatory diagram illustrating the relation between an action by an operator and a picture on a display screen. This corresponds to the action in the third display mode of the flow chart illustrated in FIG. 13 (in particular, when the specified image is the image in the "direction indicated by the operating element"). Note that the assumption about the target arrangement in the virtual space and the details of FIG. 19(*a*) are the same as the details of FIG. 17 described above and will not be described.

In contrast, as illustrated in the left half of FIG. 19(*b*), when the head of the operator 40 is oriented forward, and the sight of the gun-shaped operation unit 10 is oriented rightward, as illustrated in the right half of FIG. 19(*b*), the target 60*f* and the sight mark 61 existing rightward are displayed together on the display screen 51, but the target 60*e* existing forward is not displayed. In such a manner, with the sight of the operation unit 10 centered, it is possible to display an image existing therearound regardless of the orientation of the head. Hence, by taking advantage of this, it is possible to search for an opponent as if to light the opponent by a searchlight.

Figure 20:
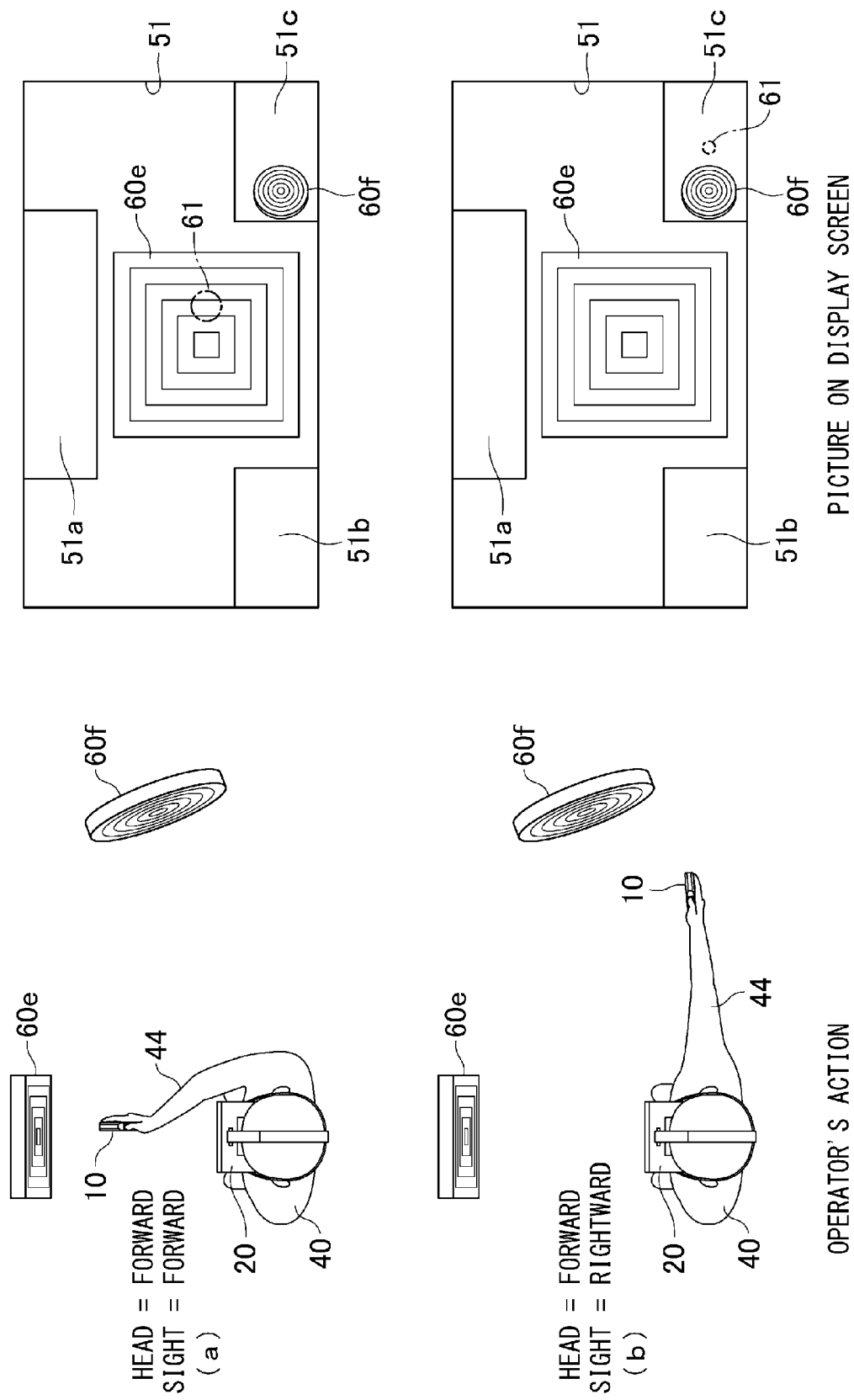
FIG. 20 is a (fourth) explanatory diagram illustrating the relation between an action by an operator and a picture on a display screen.

Next, FIG. 20 is a (fourth) explanatory diagram illustrating the relation between an action by an operator and a picture on a display screen. This corresponds to the action in the second display mode of the flow chart illustrated in FIG. 13. Note that the assumption about the target arrangement in the virtual space is the same as the details of FIG. 17 described above and will not be described.

In this example, three small windows 51a, 51b, and 51c are disposed on the display screen 51. That is, the rearward display window 51a for displaying an image in a predetermined rearward angle-of-view frame is disposed in an upper portion of the display screen 51, the leftward display window 51b for displaying an image in a predetermined leftward angle-of-view frame is disposed in a lower left portion of the display screen 51, and the rightward display window 51c for displaying an image in a predetermined rightward angle-of-view frame is disposed in a lower right portion of the display screen 51.

At this point, as illustrated in the left half of FIG. 20(a), when the head of the operator 40 is oriented forward, and the sight of the gun-shaped operation unit 10 is also oriented forward, the target 60e and the sight mark 61 existing forward are displayed together on the display screen 51, as illustrated in the right half of FIG. 20(a). In addition, the target 60f existing rightward is displayed in the rightward display window 51c, whereas nothing is displayed in the rearward display window 51a and the leftward display window 51b. In contrast, as illustrated in the left half of FIG. 20(b), when the head of the operator 40 is oriented forward, and the sight of the gun-shaped operation unit 10 is oriented rightward, the target 60e existing forward is displayed on the display screen 51, but the sight mark 61 is not displayed, as illustrated in the right half of FIG. 20(b). In contrast, the target 60f and the sight mark 61 existing on the right side are displayed in the rightward display wind 51c. Therefore, in this example, it is possible to fight against various opponents while checking mainly forward through the display screen 51 and checking rearward, and rightward and leftward through the three small windows 51a, 51b, and 51c.

Figure 21:
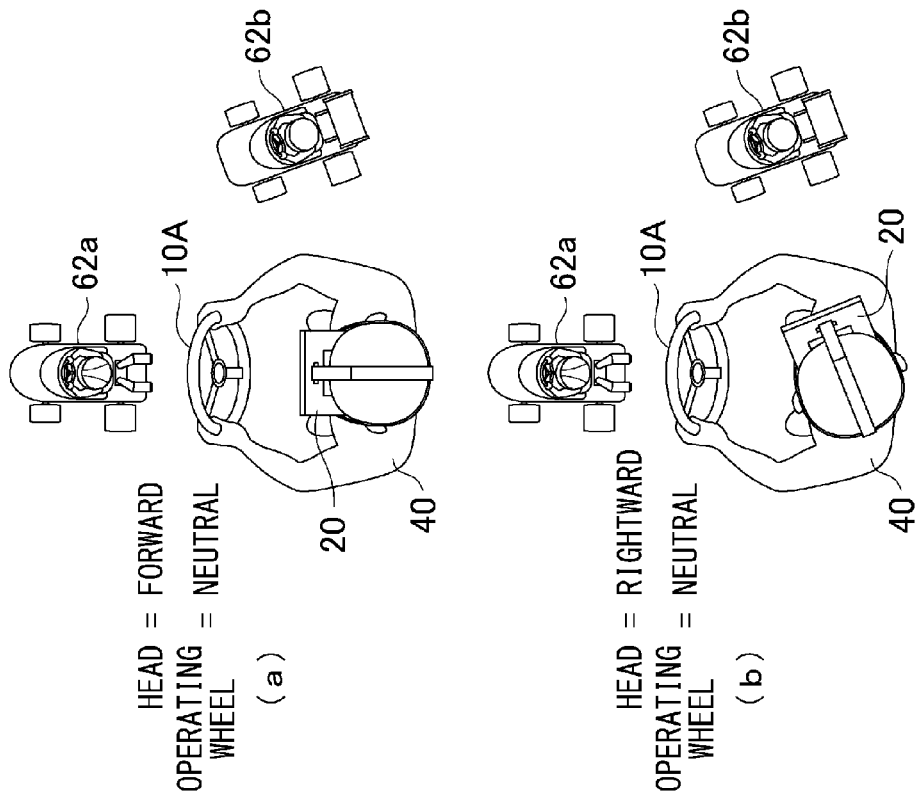
FIG. 21 is a (fifth) explanatory diagram illustrating the relation between an action by an operator and a picture on a display screen.

Next, FIG. 21 is a (fifth) explanatory diagram illustrating the relation between an action by an operator and a picture on a display screen. This corresponds to the action in the first display mode of the flow chart illustrated in FIG. 13. Now assume that a vehicle 62a exists forward of the operator 40, and a vehicle 62b exists rightward thereof, in a virtual space of a racing game perceived by the operator 40 through a head mounted display.

At this point, as illustrated in the left half of FIG. 21(a), when the head of the operator 40 is oriented forward, and the steering-wheel-shaped operation unit 10A indicates a steering neutral, a forward vehicle 62a, and a front portion 63a and a steering wheel figure 63b of a vehicle driven by the operator 40 are displayed on the display screen 51, as illustrated in the right half of FIG. 21(a). In contrast, as illustrated in the left half of FIG. 21(b), when the head of the operator 40 is oriented rightward, and the steering-wheel-shaped operation unit 10A indicates the steering neutral, the vehicle 62b existing rightward is displayed on the display screen 51, as illustrated in the right half of FIG. 21(b). Therefore, in this example, it is possible to enjoy the racing game while turning a head to confirm vehicles therearound.

Next, FIG. 22 is a (sixth) explanatory diagram illustrating the relation between an action by an operator and a picture on a display screen. This corresponds to the action in the first display mode of the flow chart illustrated in FIG. 13. Now assume that the vehicle 62a exists forward of the operator 40, in the virtual space of the racing game perceived by the operator 40 through the head mounted display.

At this point, as illustrated in the left half of FIG. 22(a), when the head of the operator 40 is oriented forward, and the steering-wheel-shaped operation unit 10A indicates the steering neutral, the vehicle 62a existing forward and the front portion 63a and the steering wheel figure 63b of the vehicle driven by the operator 40 are displayed on the display screen 51, as illustrated in the right half of FIG. 22(a). In contrast, as illustrated in the left half of FIG. 22(b), when the head of the operator 40 is oriented forward, and the steering-wheel-shaped operation unit 10A indicates a right turn (a rightward rotation), the vehicle 63a of the operator 40 being turning to the right side and the steering wheel figure 63b being rotated rightward are displayed on the display screen 51, as illustrated in the right half of FIG. 22(b). Therefore, in this example, it is possible to enjoy the racing game while freely changing the direction of travel by the operation of the steering-wheel-shaped operation unit 10A and experiencing changes in scenery in a running state in the virtual space.

Figure 23:
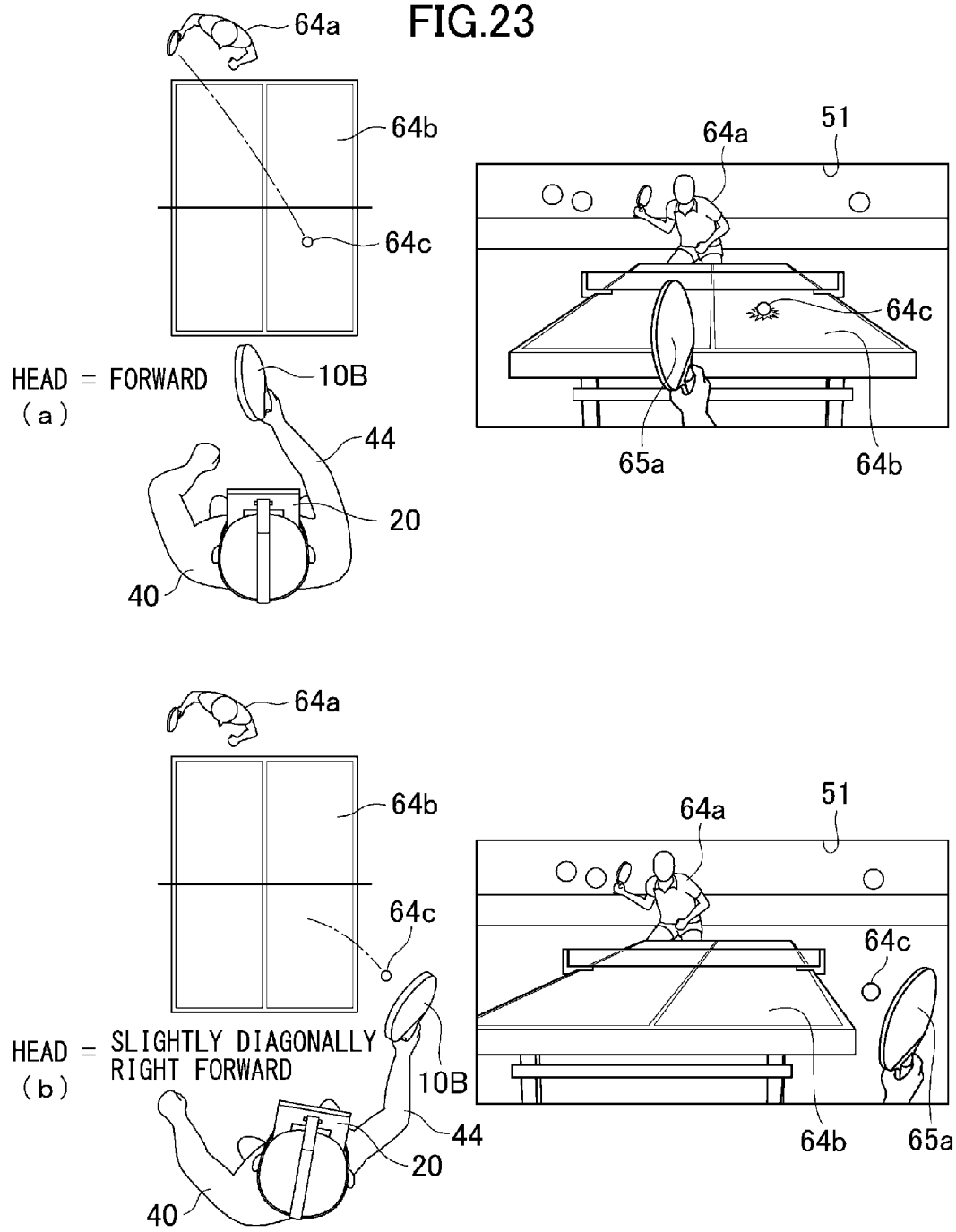
FIG. 23 is a (seventh) explanatory diagram illustrating the relation between an action by an operator and a picture on a display screen.

Next, FIG. 23 is a (seventh) explanatory diagram illustrating the relation between an action by an operator and a picture on a display screen. This also corresponds to the action in the first display mode of the flow chart illustrated in FIG. 13. Now assume that an opposite operator 64a, a table tennis table 64b, and a returned ping-pong ball 64c exist forward of the operator 40, in a virtual space of a table tennis game perceived by the player 40 through a head mounted display.

At this point, as illustrated in the left half of FIG. 23(a), when the head of the operator 40 is oriented forward, an image in which the opposite operator 64a, the table tennis table 64b, and the ping-pong ball 64c are seen from substantially in front is displayed on the display screen 51, as illustrated in the right half of FIG. 23(a). In addition, a paddle graphic 65a is displayed on the display screen 51, in accordance with a position or a posture corresponding to the position or posture of the paddle-shaped operation unit 10B held by the operator 40. In contrast, as illustrated in the left half of FIG. 23(b), when the head of the operator 40 is slightly rotated rightward, and the paddle-shaped operation unit 103 is subjected to the ball-hitting operation, so as to try returning the ping-pong ball 64c, a figure in which the opposite operator 64a, the table tennis table 64b, and the ping-pong ball 64c are seen from slightly right is displayed on the display screen 51, as illustrated in the right half of FIG. 23(b). In addition, on the display screen 51, a paddle graphic 5a having a predetermined position and inclination is displayed in response to the ball-hitting operation of the paddle-shaped operation unit 103 held by the operator 40. Therefore, in this example, it is possible to enjoy the game while confirming, in the virtual space, a surrounding environment including the opposite operator that is seen from the posture of the head in the ball-hitting action and moreover confirming a paddle graphic that is reflective of an actual ball-hitting action by the paddle, as if in an actual table tennis game.

As seen from above, in the present invention, in the state where the detection coordinate space of the first motion sensor (incorporated in the smartphone) is aligned with the detection coordinate space of the second motion sensor (incorporated in the operating element), the position, posture, and changes therein of the operating element that are determined based on the motion information from the second motion sensor are projected on the panoramic image in the form of various corresponding figures, and it is thus possible to enjoy the video game while manipulating various tools with sensation similar to that in the real space, in the virtual game space formed by the panoramic image.

Further, in the above embodiment, the information processing device according to the present invention, is implemented as a video game device, but the application of the device according to the present invention is not limited to this, and the information processing device can be implemented as a device to execute any computer software.

Figure 24:
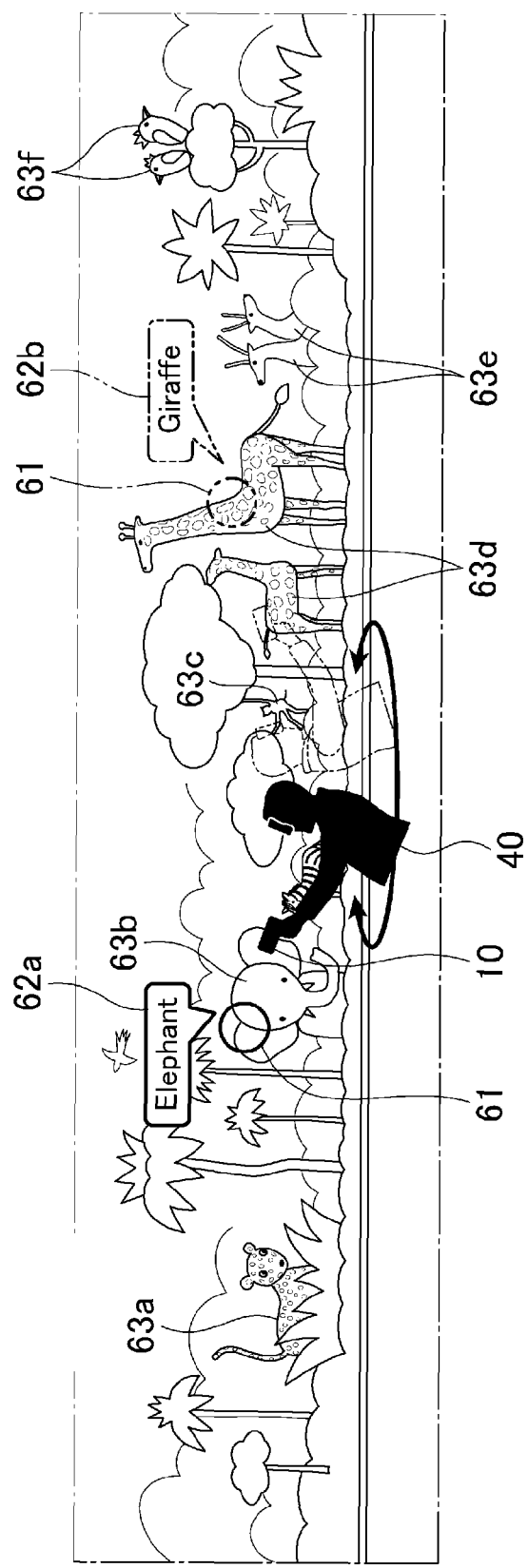
FIG. 24 is an explanatory diagram illustrating an application example of the present invention to English teaching materials software for infants.

FIG. 24 is an explanatory diagram illustrating an application example of the device according to the present invention to English teaching materials software for infants. As illustrated in FIG. 24, in this example, target graphics 63a to 63f that correspond to various kinds of animals and function as targets are projected in a virtual space constituted by a 360-degree panoramic image, and when the operator 40 holds the gun-shaped operation unit 10 and pulls a trigger aiming the sight mark 61 to one of the target graphics 63a to 63f, the triggering is recognized in the processing as an event occurrence, which causes a balloon figure 62a or 62b each containing the name display of an animal in question to appear. The name of an animal displayed in the balloon figure is written in English (e.g., "Elephant", "Giraffe", or the like), which makes the device function as elementary English teaching materials for infants.

Figure 25:
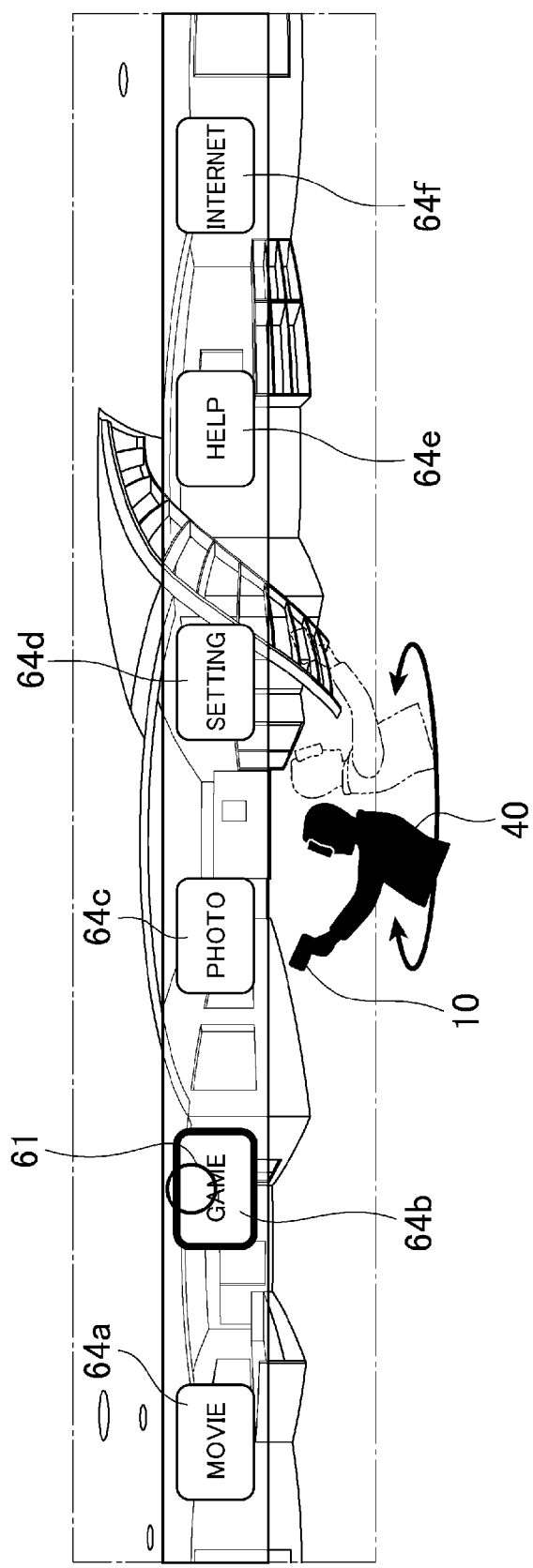
FIG. 25 is an explanatory diagram illustrating an application example of the present invention to a menu selecting process in general software

FIG. 25 is an explanatory diagram illustrating an application example of the device according to the present invention to a menu selecting process in general software. As illustrated in FIG. 25, in this example, target graphics 64a to 64f that correspond to various menu items ("MOVIE", "GAME", "PHOTO", "SETTING", "HELP", "INTERNET") and function as targets are projected in a virtual space constituted by a 360-degree panoramic image, and when the operator 40 holds the gun-shaped operation unit 10 and pulls a trigger aiming the sight mark 61 to one of the target graphics 64a to 64f, the triggering is recognized in the processing as an event occurrence, which causes the transition to a process represented by a menu item name.

Figure 26:
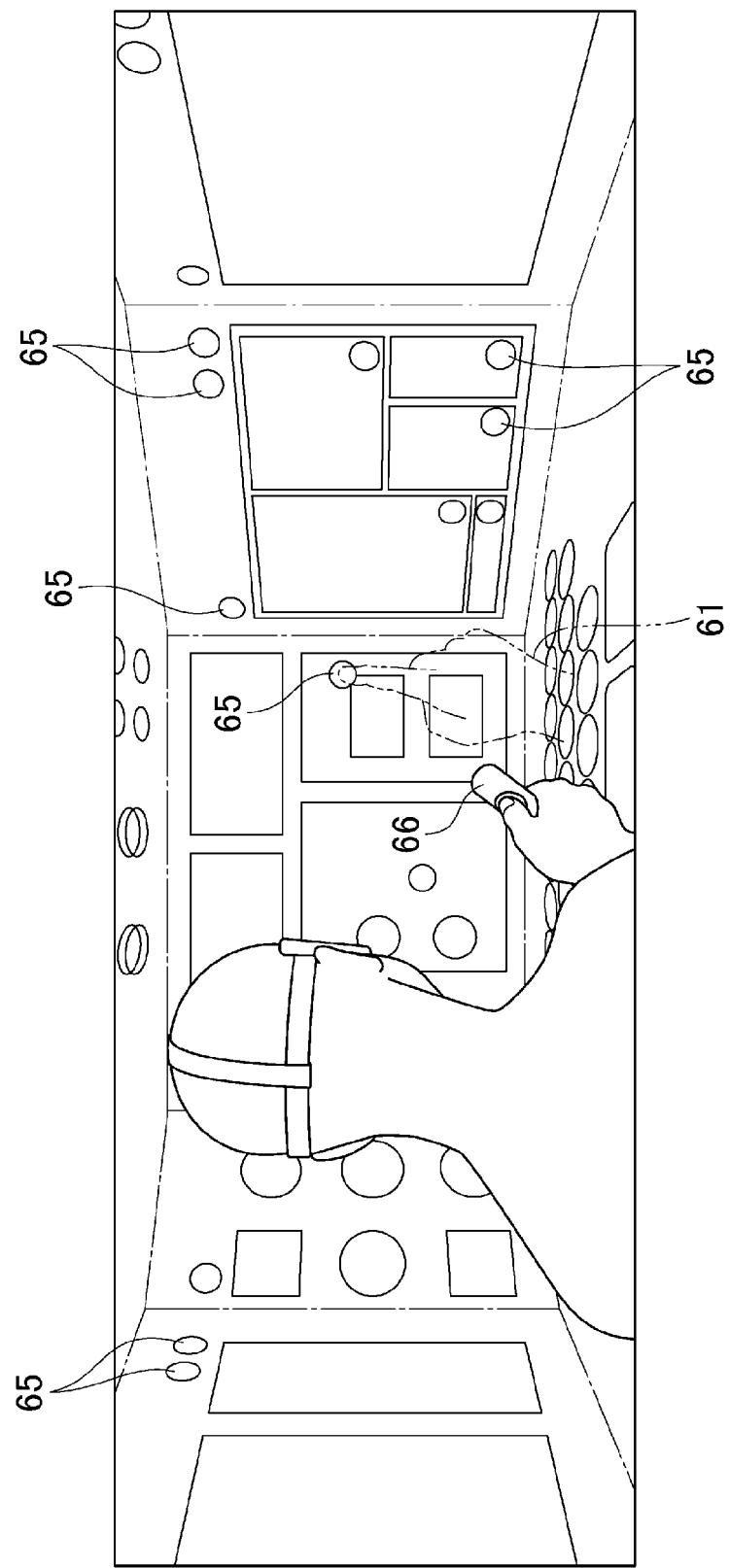
FIG. 26 is an explanatory diagram illustrating an application example of the present invention to a push button process in general software.

FIG. 26 is an explanatory diagram illustrating an application example of the device according to the present invention to a push button process in general software. As illustrated in FIG. 26, in this example, target graphics 65 that correspond to various push buttons and function as targets are projected in a virtual space constituted by a 360-degree panoramic image (e.g., equivalent to a supervisory panel or an operation panel), and when the operator 40 holds a stick-shaped operation unit 66, points the stick-shaped operation unit 66 to a target graphic corresponding to a desired push button in the virtual space to adjust the first-finger-shaped sight mark 61 to one of the target graphics 65, and performs pressing operation on a button 66a of the operation unit 66, the pressing is recognized in the processing as an event occurrence, which causes the execution of a process assigned to the push button. Note that the electrical configuration inside the stick-shaped operation unit 66 is not illustrated, but it is obvious that the electrical configuration is substantially the same as the circuit configurations illustrated in advance in FIG. 3 to FIG. 5.

That is, the electric circuitry inside the stick-shaped operation unit 66, which is not illustrated, includes a control unit that is constituted by a microprocessor, an ASIC, or the like, and performs integrated control on the entire operating element, a communication unit that performs short range communication such as Bluetooth, three sensors that constitute the second motion sensor, namely, a triaxial acceleration sensor, a triaxial angular velocity sensor, and a triaxial geomagnetic sensor, a battery, a storage unit, and a switch that is turned on or off interlocking with a push button. Then, the above-mentioned action is achieved by the control unit executing the same processing as that illustrated in the flow chart of FIG. 6.

INDUSTRIAL APPLICABILITY

According to the present invention, in an information processing device that includes a head mounted display of this kind to enable head tracking display, it is possible to improve operability in information input.

REFERENCE SIGNS LIST 1 information processing device
10 gun-shaped operation unit
10A steering-wheel-shaped operation unit
10B paddle-shaped operation unit
11 barrel
11A radial arm part
12 grip portion
12A annular portion
13, 13A, 133 first operating element
13a first switch
14, 14A, 143 second operating element
14a second switch
15, 15A, 153 third operating element
15a third switch
20 head mounted tool
21 head-side belt
22 head-top belt
23 main body
24 opening
25 lid plate
26 fastener
27 partition plate
28 optical system
30 information processing unit
40 operator
41 head
42 right hand
42a thumb
42b first finger
42c second finger
42d third finger
42e fourth finger
43 player's eye
44 right arm
50 smartphone
51 display screen
51a rearward display window
51b leftward display window
51c rightward display window
60a target
60b target
60c target
60d target
60e target
60f target
61 sight mark
62a, 52b balloon figure
63a to 63f target graphics corresponding to animals
64a to 64f target graphics corresponding to menu items
65 target graphics corresponding to push buttons
66 stick-shaped operating element
66a push button
501 control unit
502 storage unit
503 display
504 inputting operation unit (touch panel)
505 inputting operation unit (button)
506 triaxial acceleration sensor
507 triaxial angular velocity sensor
508 triaxial geomagnetic sensor
509 GPS
510 illuminance sensor 511 timer
512 battery
513 vibration unit
514 communication unit
515 audio output unit
516 audio input unit
517 speaker unit
518 camera unit
519 connector
1601 control unit
1602 communication unit
1603 triaxial acceleration sensor
1604 triaxial angular velocity sensor
1605 triaxial geomagnetic sensor
1606 battery
1607 storage unit
G predetermined angle-of-view frame

The invention claimed is:

1. An information processing device, comprising:
   an operation unit that is configured to be hand-held or wearable by an operator of the information processing device;
   a head mounted display that is mounted to a head of the operator of the information processing device in such a manner as to be disposed in front of the eyes of the operator;
   a first motion sensor that is configured to detect a motion of the head of the operator, including at least a triaxial acceleration sensor and a triaxial geomagnetic sensor;
   a second motion sensor that is configured to detect a motion of the operation unit, including at least a triaxial acceleration sensor and a triaxial geomagnetic sensor; and
   an information processing unit that displays, on the display, an image in a predetermined angle-of-view frame in a global image defined on a preset world coordinate system,
      where the predetermined angle-of-view frame corresponds to an orientation of the head of the operator detected using the first motion sensor,
      where the information processing unit has a processor to execute a specific process corresponding to a posture of the operation unit detected using the second motion sensor;
      where the information processing unit, further includes
         a basic posture acquisition unit that acquires a basic posture of the head of the operator on a first local coordinate system from a detection output of the triaxial acceleration sensor included in the first motion sensor, and a posture of the operation unit on a second local coordinate system from a detection output of the triaxial acceleration sensor included in the second motion sensor, respectively;
         a specific absolute azimuthal direction acquisition unit that acquires a specific absolute azimuthal direction of the head of the operator based on a specific azimuthal direction component detected using the triaxial geomagnetic sensor included in the first motion sensor and a vertical downward direction component detected using the triaxial acceleration sensor included in the first motion sensor, and a specific absolute azimuthal direction of the operation unit based on a specific azimuthal direction component detected using the triaxial geomagnetic sensor included in the second motion sensor and a vertical downward direction component detected using the triaxial acceleration sensor included in the second motion sensor, respectively; and
         a posture composition unit that composes the posture of the head of the operator and the posture of the operation unit on the world coordinate system based on the basic posture of the head of the operator on the first local coordinate system and the basic posture of the operation unit on the second local coordinate system, acquired by the basic posture acquisition unit, and the specific absolute azimuthal direction of the head of the operator and the specific absolute azimuthal direction of the operation unit, acquired by the specific absolute azimuthal direction acquisition unit.

2. The information processing device according to claim 1,
   the specific process is a process of drawing a predetermined cursor on the global image in the direction indicated by the operation unit, or a process of determining that a predetermined event has occurred based on, at least, a comparison of i) an indicated position on the global image in the direction indicated by the operation unit to ii) a target position disposed in advance on the global image, and determining that both of these coincide within a predetermined allowable range.

3. The information processing device according to claim 1,
   wherein the specific process is a process of drawing a figure corresponding to a path of the movement of the object at a corresponding position on the global image in the direction indicated by the operation unit, or a process of determining that a predetermined event has occurred based on, at least, a comparison of i) the path of the movement of the object to ii) a target path disposed in advance on the global image, and determining that both of these coincide within a predetermined allowable range.

4. The information processing device according to claim 1,
   wherein the information processing unit is a unit that has the processor to execute a computer program stored in a memory for implementing a shooter game,
   where the operation unit has an exterior shape in a form of a predetermined shooting weapon, and
   the specific process is a process of drawing a predetermined sight mark on the global image in direction indicated by the operation unit, or a process of determining that a hitting event has occurred at least on condition that a sight position on the global image in the direction indicated by the operation unit is compared with a predetermined target position disposed in advance on the global image and these both coincide within a predetermined allowable range.

5. The information processing device according to claim 1,
   wherein the information processing unit is a unit that has the processor to execute a computer program stored in a memory for implementing a racing game, where the operation unit has an exterior shape in a form of a steering tool of a predetermined movable body, and
   where the specific process is a process of drawing a figure corresponding to the movable body on the global image in such a manner that the figure travels in the direction indicated by the operation unit.

6. The information processing device according to claim 5,
wherein the racing game is a car racing game,
where the steering tool has an exterior shape in a form of a steering wheel of a racing car, and
where the specific process is a process of drawing a figure corresponding to the racing car on the global image in such a manner that the figure travels in the direction indicated by the steering wheel.

7. The information processing device according to claim 1,
wherein the information processing unit is a unit that has the processor to execute a computer program stored in a memory for implementing a sports game involving an action of hitting or returning a ball with the operation unit in a form of a ball-hitting tool such as a bat and a paddle, and
where the specific process is a process of drawing a figure corresponding to a path of the movement of the operation unit on the global image at a corresponding position, or a process of determining that a ball-hitting event has occurred based on, at least, a comparison of i) the path of the movement of the operation unit to ii) a target ball path disposed in advance on the global image, and these both coincide within a predetermined allowable range.

8. The information processing device according to claim 1,
wherein the information processing unit further includes a function of displaying, on the display, an image in a predetermined angle-of-view frame in the global image, the predetermined angle-of-view frame corresponding to a direction indicated by the operation unit that is identified using the second motion sensor, instead of an image corresponding to the orientation of the head of the operator or together with an image facing the orientation of the head of the operator.

9. The information processing device according to claim 1,
wherein the information processing unit further includes a function of displaying images in one or more predetermined angle-of-view frames in the global image, the one or more predetermined angle-of-view frames corresponding to one or more of directions such as a rightward, leftward, rearward, upward, and downward direction with respect to the orientation of the head of the operator identified using the first motion sensor, in one or more predetermined windows on the display together with an image corresponding to the orientation of the head of the operator.

10. The information processing device according to claim 1,
wherein the display retained on the head, the first motion sensor, and the information processing unit are substituted with corresponding functions of a commercial smartphone.

11. The information processing device according to claim 10, further comprising:
a head mounted tool that is mountable to a head and surrounds the head except a front opening, a lid plate portion that is hinged so as to open and close the front opening of the head mounted tool, a smartphone that is retained on an inner surface of the lid plate portion with the screen turned inward, and an optical system that is interposed between eyes of a wearer and the screen of the smartphone retained on the lid portion.

12. The information processing device according to claim 1,
wherein the global image includes a full spherical panoramic image, a hemispherical panoramic image, a 360-degree panoramic image, or a panoramic image of a given area thereof.

13. A non-transitory computer-readable medium configured to store instructions that when executed by a processor cause a computer to function as an information processing unit in an information processing device, where the information processing unit is configured to cooperate with other components of the information processing device comprising:
where the information processing device, includes
a head mounted display that is mounted to a head of an operator in such a manner as to be disposed in front of the eyes of the operator;
a first motion sensor that is configured to detect at least an orientation of the head of the operator,
where the first motion sensor includes at least a triaxial acceleration sensor and a triaxial geomagnetic sensor;
an operation unit in which a second motion sensor is incorporated, the operation unit being configured to be hand-held or wearable by the operator,
where the second motion sensor is configured to detect a motion of the operation unit and includes at least a triaxial acceleration sensor and a triaxial geomagnetic sensor; and
the information processing unit,
wherein the information processing unit includes
a unit for displaying, on a display for the information processing device, an image in a predetermined angle-of-view frame in a global image defined on a preset world coordinate system,
where the predetermined angle-of-view frame corresponding to the orientation of the head of the operator is identified using the first motion sensor; and
an information processing unit for executing a specific process corresponding to a posture of the operator operation unit detected using the second motion sensor,
where the information processing unit, further includes
a basic posture acquisition unit that acquires a basic posture of the head of the operator on a first local coordinate system from a detection output of the triaxial acceleration sensor included in the first motion sensor, and a posture of the operation unit on a second local coordinate system from a detection output of the triaxial acceleration sensor included in the second motion sensor, respectively;
a specific absolute azimuthal direction acquisition unit that acquires a specific absolute azimuthal direction of the head of the operator based on a specific azimuthal direction component detected using the triaxial geomagnetic sensor included in the first motion sensor and a vertical downward direction component detected using the triaxial acceleration sensor included in the first motion sensor, and a specific absolute azimuthal direction of the operation unit based on a specific azimuthal direction component detected using the triaxial geomagnetic sensor included in the second motion sensor and a vertical downward direction component detected using the triaxial acceleration sensor included in the second motion sensor, respectively; and a posture composition unit that composes the posture of the head of the operator and the posture of the operation unit on the world coordinate system based on the basic posture of the head of the operator on the first local coordinate system and the basic posture of the operation unit on the second local coordinate system, acquired by the basic posture acquisition unit, and the specific absolute azimuthal direction of the head of the operator and the specific absolute azimuthal direction of the operation unit, acquired by the specific absolute azimuthal direction acquisition unit.

14. An information processing device, comprising:

a head mounted tool;

a smartphone that is in the head mounted tool and is disposed such that a display screen of the smartphone faces a front of the eyes of a wearer through a predetermined optical system, where the smartphone includes a first motion sensor incorporated therein;

an operation unit that includes a second motion sensor incorporated therein, and that is configured to be handheld or wearable by the wearer, and further has a communication unit configured to be in a wireless or wired connection with the smartphone, wherein the smartphone includes:

a head tracking image display unit for displaying, on the display, an image in a predetermined angle-of-view frame in a global image defined on a preset world coordinate system, predetermined angle-of-view frame corresponding to the orientation of the head of the operator identified using the first motion sensor;

a specific processing execution unit for executing a specific process corresponding to an indication of the operator identified by the motion of the operation unit that is detected using the second motion sensor, where the smartphone, further includes a basic posture acquisition unit that acquires a basic posture of the head of the operator on a first local coordinate system from a detection output of a triaxial acceleration sensor included in the first motion sensor, and a posture of the operation unit on a second local coordinate system from a detection output of a triaxial acceleration sensor included in the second motion sensor, respectively;

a specific absolute azimuthal direction acquisition unit that acquires a specific absolute azimuthal direction of the head of the operator based on a specific azimuthal direction component detected using a triaxial geomagnetic sensor included in the first motion sensor and a vertical downward direction component detected using the triaxial acceleration sensor included in the first motion sensor, and a specific absolute azimuthal direction of the operation unit based on a specific azimuthal direction component detected using a triaxial geomagnetic sensor included in the second motion sensor and a vertical downward direction component detected using the triaxial acceleration sensor included in the second motion sensor, respectively; and a posture composition unit that composes the posture of the head of the operator and the posture of the operation unit on the world coordinate system based on the basic posture of the head of the operator on the first local coordinate system and the basic posture of the operation unit on the second local coordinate system, acquired by the basic posture acquisition unit, and the specific absolute azimuthal direction of the head of the operator and the specific absolute azimuthal direction of the operation unit, acquired by the specific absolute azimuthal direction acquisition unit.

15. The information processing device according to claim 14, wherein the operation unit has an exterior shape in a form of a tool that is used in a virtual space perceived through the display.

16. The information processing device according to claim 15, wherein the operation unit has an exterior shape in a form of a gun and includes:

an operating element that is positioned in a trigger portion;

an operation information generation unit that generates operation information corresponding to an operation of the operating element in response to the operation of the operating element; and the communication unit is configured to transmit the operation information to the smartphone in a wired or wireless manner.

17. The information processing device according to claim 14, wherein the head mounted tool includes:

a main body with a window opening that opens in front of eyes of the wearer; a window plate that is hinged in such a manner as to open and close the window opening of the main body and open outward;

a retainer that retains a smartphone on an inner side of the window plate with the screen of the smartphone facing inward; and an optical system that is interposed between the eyes of the wearer and the smartphone in a state where the window plate is closed.

18. The information processing device according to claim 14, further comprising:

An inputting operation unit for the information processing device, that includes a main body that has an exterior shape in a form of a gun, wherein the main body includes an operating element that is positioned in a trigger portion;

an operation information generation unit that generates corresponding operation information in response to the operation of the operating element;

a motion sensor that includes one or more of a triaxial acceleration sensor, a triaxial angular velocity sensor, and a triaxial geomagnetic sensor;

a motion information generation unit that generates motion information based on an output from the motion sensor; and a communication unit that sends out the operation information generated by the operation information generation unit and the motion information generated by motion information generation unit to the information processing device in a wired or a wireless manner.

19. A non-transitory machine-readable medium configured to store instructions that, when executed by a processor of a computer, cause the computer to function as an information processing unit in an information processing device, where the information processing unit is configured to cooperate with other components of the information processing device comprising:

a head mounted tool;

a smartphone that is in the head mounted tool and is disposed such that a display screen of the smartphone faces a front of the eyes of a wearer through a predetermined optical system, where the smartphone includes a first motion sensor incorporated therein;

an operation unit that includes a second motion sensor incorporated therein, and that is configured to be handheld or wearable by the wearer, and further has a communication unit configured to be in a wireless or wired connection with the smartphone, wherein the smartphone includes:

a head tracking image display unit for displaying, on the display, an image in a predetermined angle-of-view frame in a global image defined on a preset world coordinate system, predetermined angle-of-view frame corresponding to the orientation of the head of the operator identified using the first motion sensor; and a specific processing execution unit for executing a specific process corresponding to an indication of the operator identified by the motion of the operation unit that is detected using the second motion sensor, where the smartphone, further includes a basic posture acquisition unit that acquires a basic posture of the head of the operator on a first local coordinate system from a detection output of a triaxial acceleration sensor included in the first motion sensor, and a posture of the operation unit on a second local coordinate system from a detection output of a triaxial acceleration sensor included in the second motion sensor, respectively;

a specific absolute azimuthal direction acquisition unit that acquires a specific absolute azimuthal direction of the head of the operator based on a specific azimuthal direction component detected using a triaxial geomagnetic sensor included in the first motion sensor and a vertical downward direction component detected using the triaxial acceleration sensor included in the first motion sensor, and a specific absolute azimuthal direction of the operation unit based on a specific azimuthal direction component detected using a triaxial geomagnetic sensor included in the second motion sensor and a vertical downward direction component detected using the triaxial acceleration sensor included in the second motion sensor, respectively; and a posture composition unit that composes the posture of the head of the operator and the posture of the operation unit on the world coordinate system based on the basic posture of the head of the operator on the first local coordinate system and the basic posture of the operation unit on the second local coordinate system, acquired by the basic posture acquisition unit, and the specific absolute azimuthal direction of the head of the operator and the specific absolute azimuthal direction of the operation unit, acquired by the specific absolute azimuthal direction acquisition unit.

* * * * *